(12) United States Patent
Lutz

(10) Patent No.: US 9,773,387 B2
(45) Date of Patent: Sep. 26, 2017

(54) POWER OUTAGE SAFETY LIGHT BULB

(71) Applicant: Ledsens LLC, Oconomowoc, WI (US)

(72) Inventor: Chamy ChiaChen Lutz, Oconomowoc, WI (US)

(73) Assignee: LEDSENS LLC, Oconomowoc, WI (US)

( * ) Notice: Subject to any disclaimer, the term of this patent is extended or adjusted under 35 U.S.C. 154(b) by 0 days.

(21) Appl. No.: 15/145,622

(22) Filed: May 3, 2016

(65) Prior Publication Data

US 2016/0328928 A1 Nov. 10, 2016

Related U.S. Application Data

(60) Provisional application No. 62/156,725, filed on May 4, 2015.

(51) Int. Cl.
| H05B 37/02 | (2006.01) |
| G08B 5/36 | (2006.01) |
| G08B 21/18 | (2006.01) |
| H02J 7/00 | (2006.01) |

(52) U.S. Cl.
CPC ............. *G08B 5/36* (2013.01); *G08B 21/182* (2013.01); *H02J 7/007* (2013.01); *H02J 7/0029* (2013.01)

(58) Field of Classification Search
CPC .... H05B 37/02; H05B 37/0227; H05B 37/04; H05B 33/0854; G08B 5/36; G08B 21/182; H02J 7/0029; H02J 7/007
See application file for complete search history.

(56) References Cited

U.S. PATENT DOCUMENTS

| 8,708,516 B2 | 4/2014 | Fisher et al. | |
| 8,907,523 B2 | 12/2014 | Mohammed Suhura et al. | |
| 9,232,593 B2 | 1/2016 | Fischer et al. | |
| 2009/0154148 A1* | 6/2009 | Meyer | F21L 2/00 362/157 |
| 2010/0039792 A1* | 2/2010 | Meyers | F21L 2/00 362/20 |
| 2010/0088970 A1* | 4/2010 | Miller | E04C 2/296 52/1 |
| 2010/0264737 A1 | 10/2010 | Chandler et al. | |

(Continued)

FOREIGN PATENT DOCUMENTS

| WO | 2012052728 A1 | 4/2012 | |
| WO | WO 2015092824 A2 * | 6/2015 | ............. F21S 9/024 |

OTHER PUBLICATIONS

Green Creative; Product Page from web-site: http://gc-lighting.com/categories/br/; 1 page; 2016 US.

(Continued)

*Primary Examiner* — Don Le
(74) *Attorney, Agent, or Firm* — Boyle Fredrickson, S.C.

(57) ABSTRACT

A lamp device with power outage sensing abilities to detect when a primary power source is interrupted and to energize primary LEDs when primary power source is ON, and to energize backup LEDs when the primary power source is OFF. The power outage sensing circuit may also detect a light switch condition allowing for greater efficiency in emergency power supply usage. A battery charging system may provide battery thermal protection and multiple charge rates to improve battery charging as a function of the temperature in the lighting device.

21 Claims, 19 Drawing Sheets

(56) References Cited

U.S. PATENT DOCUMENTS

| | | |
|---|---|---|
| 2011/0068692 A1 | 3/2011 | Tien et al. |
| 2012/0098655 A1 | 4/2012 | Preta et al. |
| 2012/0099306 A1* | 4/2012 | Balfour ............... F21V 23/0442 |
| | | 362/231 |
| 2013/0162166 A1* | 6/2013 | Jonsson .................. F21V 23/04 |
| | | 315/250 |
| 2014/0104812 A1* | 4/2014 | Patton ................... F21S 10/046 |
| | | 362/96 |
| 2014/0218953 A1* | 8/2014 | Ungru ................ H05B 33/0824 |
| | | 362/545 |
| 2014/0265845 A1* | 9/2014 | Williams ........... H05B 37/0245 |
| | | 315/86 |
| 2014/0268697 A1 | 9/2014 | Smith et al. |
| 2015/0256028 A1 | 9/2015 | Suman |
| 2016/0330825 A1* | 11/2016 | Recker ............... H05B 37/0272 |
| 2016/0339203 A1* | 11/2016 | Krames .................. F21V 15/01 |
| 2017/0071045 A1* | 3/2017 | Harvey ............. H05B 33/0845 |

OTHER PUBLICATIONS

International Search Report & Written Opinion for Application No. PCT/US2016/030677; Filing Date May 4, 2016.

* cited by examiner

POWER OUTAGE SAFETY LIGHT BULB

CROSS REFERENCE TO RELATED APPLICATION

This application claims the benefit of U.S. provisional application No. 62/156,725 filed May 4, 2015, the entire contents of which are hereby incorporated in its entirety by reference.

BACKGROUND OF THE INVENTION

A light emitting diode (LED) is a semiconductor that gives off light when current is passed through it. The light emitted by these elements resembles most incandescent or compact fluorescent (CFL) light bulbs but may be preferred because they consume less electricity and last longer. In addition, compared to incandescent or CFL bulbs, LED bulbs are generally smaller in size, are more durable and reliable, and can better withstand extreme temperatures.

LEDs were first designed to be used in circuits that run on low-powered DC voltage. They were often used in low intensity lighting applications, such as in an exit sign, a power button on a computer, or a light on a video camera. Subsequently, high-powered LEDs have also been developed to illuminate a larger area, such as in flashlights, light bulbs, or integrated light fixtures. However, the heat generated by these high-powered LED devices is much greater than in the low intensity lighting applications, as further explained below.

LEDs are still typically powered by a DC power source, such as a battery, where current runs in one direction only. Some lighting devices have utilized drivers or transformers between the building wiring or wall socket and the fixture to provide the required DC voltage to the lighting device. Other lighting devices, such as LED light bulbs, include built-in drivers or transformers for performing such a function. The need for a driver or transformer can be very space consuming, especially if required to fit within a standard light bulb encasement. Additionally, the additional component of a driver or converter renders the electrical components less stable and more prone to failure. The heat derived from the use of a driver or converter often puts the components at greater risk for electrical failure.

However, a new approach for lighting has been the development of AC-LEDs, which can operate directly from an AC power supply. These AC-LEDs can handle a higher voltage and can accept an AC voltage directly, without AC to DC conversion. Several methods of creating the AC-LEDs have been employed. For example, a method developed by Seoul Semiconductor takes two strings of series-connected die, connected in different directions whereby one string is illuminated during the positive half of the AC cycle, the other during the negative half. The strings are alternately energized and de-energized at the 50/60 Hz frequency of the AC main power source, and thus the LEDs always appears to be energized. It is recognized that other methods for making an AC-LED have been developed. Through these methods, the AC-LEDs can transmit power more efficiently and effectively, without the need for intervening electronics.

In certain lighting applications, these AC-LEDs have been employed as a primary light source when utility power is available. A lighting device employing these AC-LEDs in combination with "standard" DC-powered LEDs in the same lighting device may provide an additional benefit during a power failure. Namely, the DC-LEDs, or a portion thereof, may have power supplied from a battery to provide emergency lighting during a power outage.

It is desirable to maintain a full charge in the battery to ensure maximum duration of emergency lighting. A battery charging circuit may be provided to charge a battery from the AC power used to power the AC-LEDs. However, the addition of a battery charging circuit has its drawbacks. The battery charging circuit requires additional electronic components that take up additional space, and a portion of the electronic components includes power conversion devices that generate additional heat. In addition, operation of the AC-LEDs also generates heat. If the temperature rise is too great, the battery begins to charge less efficiently and eventually can no longer be charged. Further, attempting to charge the battery at too high of a temperature can result in permanent damage to the battery. Thus, it would be desirable to provide an improved battery charging system that can maintain charge in the battery while the AC-LEDs are operational without overheating.

SUMMARY OF THE INVENTION

The present invention relates to a light device utilizing two different types of light emitting elements and two different types of power sources. In particular, the present invention relates to a light device having both AC-LEDs and DC-LEDs receiving power from an AC power supply and a DC power, respectively, without the need for current conversion. The DC power may be supplied by an internal battery, which utilizes a battery charging system to store and maintain charge. The battery charging system may provide battery overheating protection and multiple charge rates to improve battery charging as a function of the temperature in the lighting device.

The present invention also relates to a lamp device with power outage sensing abilities. In particular, the present invention relates to a light device with an internal power outage sensing circuit allowing it to detect when the primary power source is present or interrupted and to energize primary LEDs when the primary power source is ON, and the ability to energize backup LEDs when the primary power source is OFF. Moreover, the power outage sensing circuit may also detect a light switch ON or OFF condition when the primary power source is interrupted, allowing for greater efficiency in emergency power supply usage.

In one embodiment of the invention, a system to detect a power loss condition is provided. The system has a light housing having a power coupling element configured to establish an electrical connection to a first power source; a first light source operatively connected to the power coupling element and configured to selectively emit light in a first operating mode; a battery configured to supply power to a second light source in a second operating mode where the battery is the second power source and where the second light source is operatively connected to the battery and configured to selectively emit light in the second operating mode; a signal amplifier configured to monitor a power condition at the first power source and send a first signal indicating a first power source condition and to monitor a light switch condition and send a second signal indicating a light switch condition; and a controller in communication with the power coupling element, the battery, the first light source, and the second light source and configured to receive the first and second signals generated by the signal amplifier, where the controller uses the first and second signals from the signal amplifier to determine operation of the first light source and the second light source.

The first light source may be on if (i) the first power source condition is on and the light switch condition is on, and the first light source may be off if (ii) the first power condition is off or (iii) the first power source condition is on and the light switch condition is off.

The second light source may be on if (iv) the first power source condition is off and the light switch condition is on, and the second light source may be off if (v) the first power source condition is off and the light switch condition is off.

The second light source may be on if (vi) the first power source condition is on. The second light source may be off if (vii) the first power source condition is on and the light position condition is off. Alternatively, the second light source may be off if (vii) the first power source condition is on.

The first power source may be in the form of an input to an asymmetrical bridge rectifier providing a first path and a second path where the first path and the second path have varying voltage drops.

Current may flow through the first path when the light switch position is on and current may flow through the second path when the light switch position is off.

The first path may provide a first number of diodes and the second path may provide a second number of diodes distinct from the first path.

The first path may provide a first number of resistors and the second path may provide a second number of resistors distinct from the first path.

The first light source and the second light source may be LEDs. The first light source may be AC LEDs and the second light source may be DC LEDs.

The system may further include a second light device coupled to the power source and an adaptor element having a diode set providing resistance in a third path.

In accordance with another aspect of the invention, a method of determining operation of a back-up light source is provided. The method involves the steps of providing a light device having a power coupling element configured to establish an electrical connection to a first power source, a first light source operatively connected to the power coupling element and configured to emit light in a first operating mode; a battery configured to supply power to a second light source in a second operating mode where the battery is the second power source and where the second light source is operatively connected to the battery and configured to emit light in the second operating mode; an electronic circuit providing a switch having a closed and open position, an asymmetrical bridge rectifier receiving current input from the first power source and providing a first path and a second path where the first path and the second path provide different voltage drops, a signal amplifier configured to monitor a power condition at the first power source and send a first signal indicating a power source condition and to monitor a switch position and send a second signal indicating a switch position condition, a controller in communication with the power coupling element and the first light source, and configured to receive the first and second signal generated by the signal amplifier. The steps further include sending a current pulse through the asymmetrical bridge rectifier; and receiving the first and second signal to determine whether the first power source is on or off and whether the switch is open or closed.

The first path may provide a first resistance and a second path may provide a second resistance greater than the first path.

Current may flow through the first path when the switch is closed and current may flow through the second path when the switch is open.

A wall light switch manually opens and closes the switch in the current pathway. The switch in the current pathway is closed when the wall light switch is in an ON position and the switch in the current pathway is open when the light switch is in an OFF position.

In accordance with another aspect of the invention, a lighting device is provided having a lamp housing that includes power coupling element configured to establish an electrical connection to the first power source; a first light source operatively connected to the power coupling element and configured to emit light in the first operating mode; and a battery configured to supply power to a second light source in a second operating mode where the battery is the second power source and where the second light source is operatively connected to the battery and configured to emit light in the second operating mode; where the lamp housing has a first portion having the first and second light source and a second portion having the battery, wherein the first portion is spatially separated from the second portion by an air gap.

The lighting device may include a battery level sensor and a battery level indicator, where the battery level sensor detects a voltage level of the battery and delivers a signal to the battery level indicator, and where the battery level indicator indicates a high battery level when the voltage is above a first threshold level, a medium battery level when the voltage is below the first threshold level and above a second threshold level, and a low battery level when the voltage is below the second threshold level.

In accordance with another aspect of the invention, a system to charge a second power source of a lighting device from a first power source in a first operating mode is provided. The system includes a power coupling element configured to establish an electrical connection to the first power source; a first light source operatively connected to the power coupling element and configured to emit light in the first operating mode; a battery configured to supply power to a second light source in a second operating mode where the battery is the second power source and where the second light source is operatively connected to the battery and configured to emit light in the second operating mode; a temperature sensor configured to monitor a temperature of the battery; and a controller in communication with the power coupling element, the battery, and the second light source and configured to receive a signal generated by the temperature sensor, where the controller allows battery charging at a first charging rate when the temperature of the battery is below a first predetermined temperature and allows battery charging at a second charging rate when the temperature of the battery is above the first predetermined temperature, where the first charging rate is higher than the second charging rate.

A controller may communicate with the power coupling element, the battery, and the second light source and be configured to receive a signal generated by the temperature sensor, where the controller allows a first light emission state when the temperature of the battery is below a first predetermined temperature and allows a second light emission state when the temperature of the battery is above the first predetermined temperature, and where the first light emission state is higher than the second light emission state.

One feature of the present invention is to distinguish a power outage condition with a light switch off condition when determining whether to operate the emergency lighting device.

Another feature of the present invention is to keep the battery within the emergency lighting device cool during operation by adopting an insulating housing design, adaptive charging rate, and light dimming as a function of battery or light device temperature.

Another feature of the present invention is to test the battery level of the emergency lighting device.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1A:
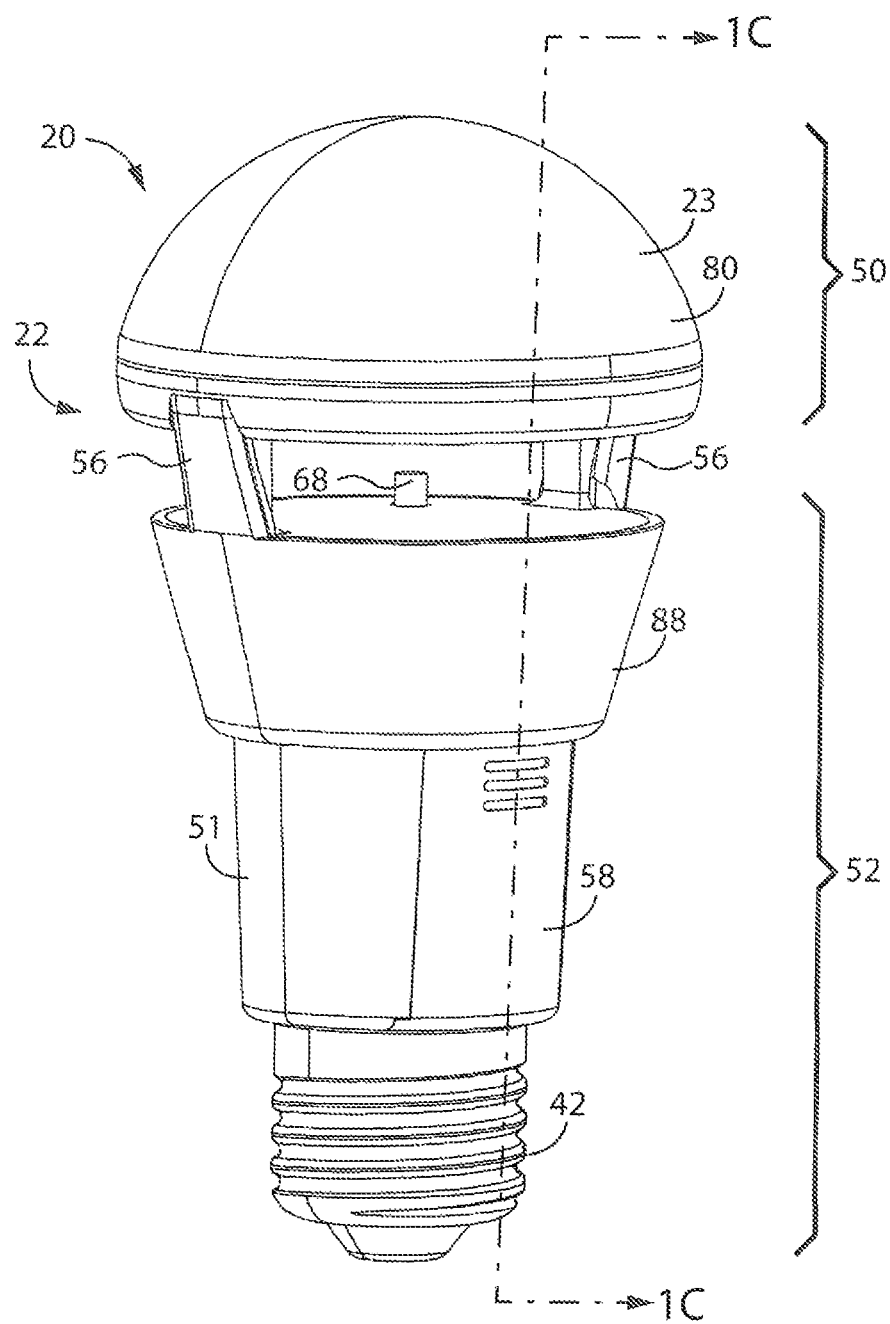
FIG. 1A is an isometric view of the light device of the present invention showing a first embodiment of the light housing with a battery within the neck of the housing.

In describing the embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

This invention relates to a lighting device that can be powered by either AC power or DC power, such as for use in an emergency lighting device, including a number of light-emitting elements configured to operate in combination with one another and including a means for detecting a loss of power condition.

Figure 1B:
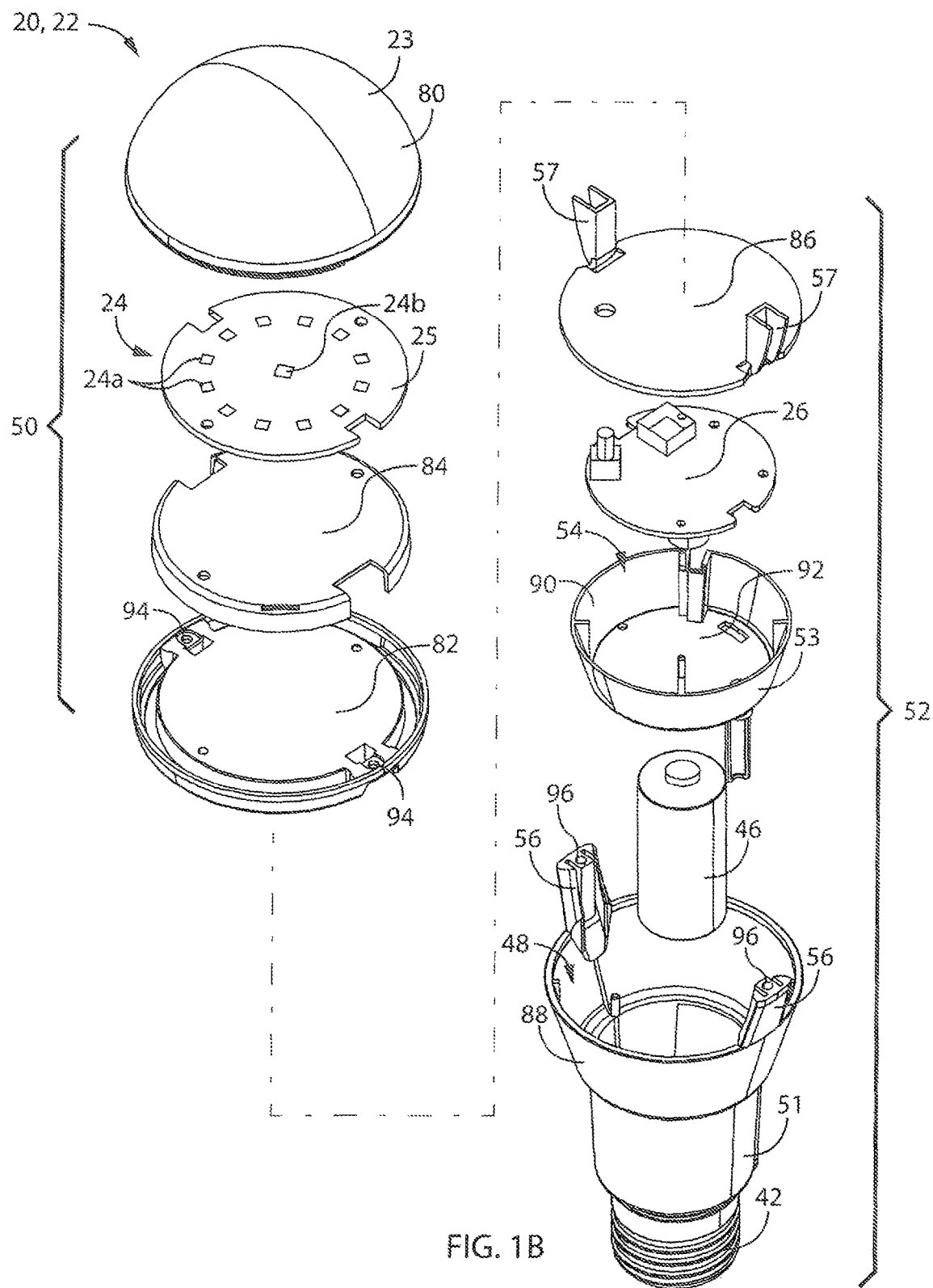
FIG. 1B is an exploded view of the light device of FIG. 1.
Figure 1C:
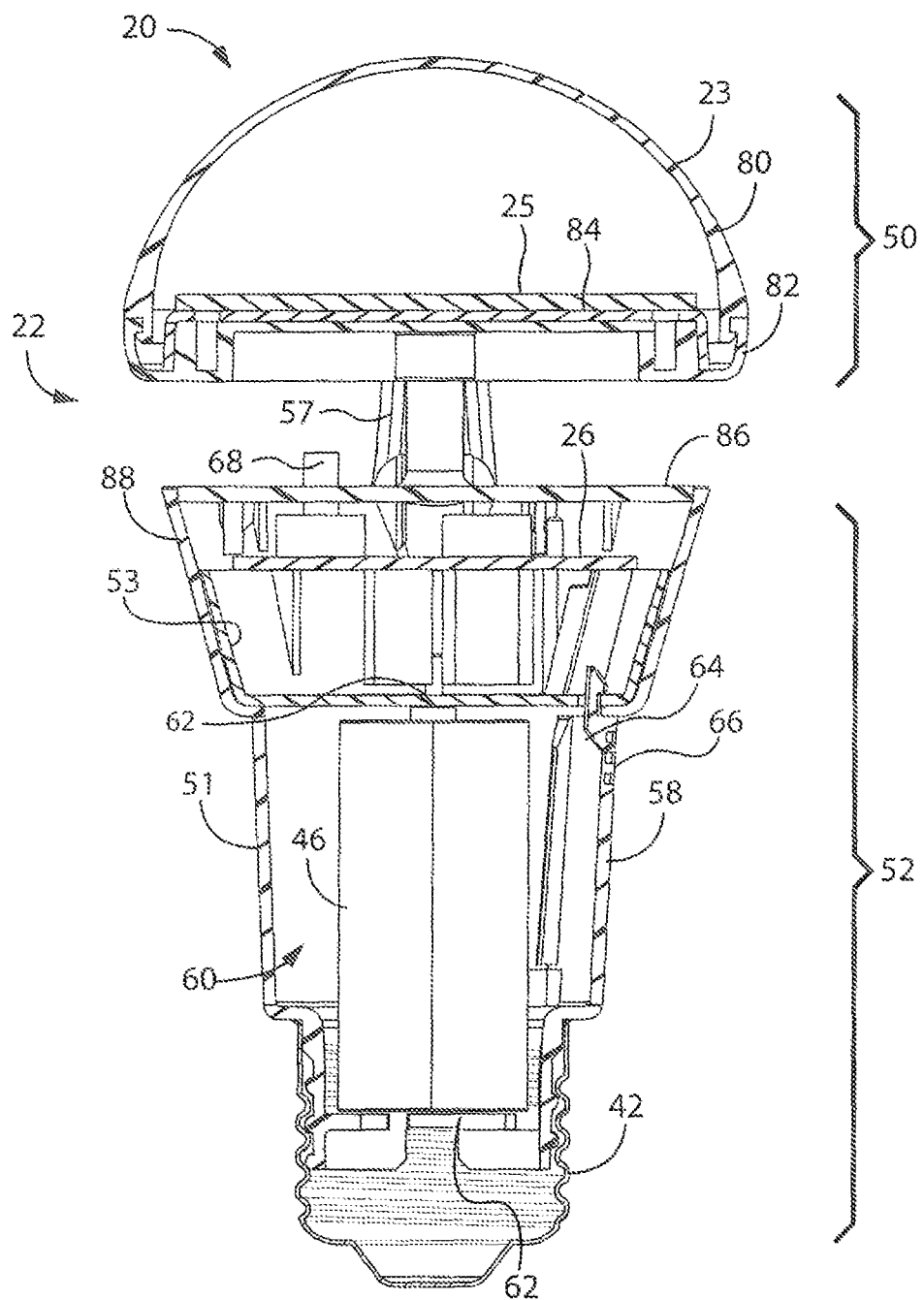
FIG. 1C is a cross section view of the light device of FIG. 1 along line 1C-1C.

Referring to FIGS. 1A-1C, a representative embodiment of the light device 20 is shown. In the illustrated embodiment, the light device 20 is a single unit light bulb or lamp that can be employed in any light fixture, such as a ceiling, wall or floor light fixture, preexisting down lighting or linear lighting fixtures, such as standard fluorescent troffers and the like, or any household ground lamp. It is contemplated that the light device 20 may be any type of lamp size and shape, such as globe, circline, straight tube, or U-shaped tube and integrated into an indoor/outdoor light fixture. The LED lamp may conform to the recognized lighting standards, such as UL and ANSI light standards, thus providing a wholly compatible light bulb or lamp for preexisting light fixtures. In one embodiment, the light device 20 is an A19 bulb meeting UL and ANSI light standards.

Figure 4:
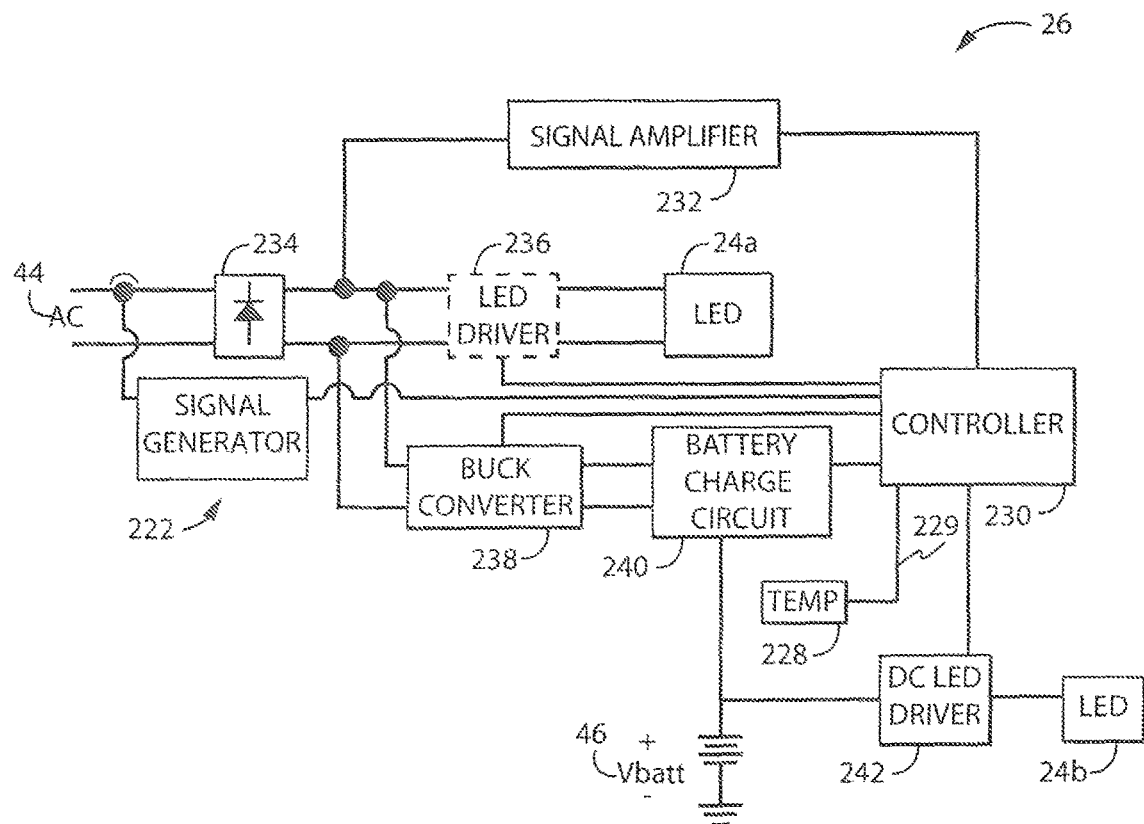
FIG. 4 is a schematic diagram of the circuitry of the electronic arrangement found in the light device of the present invention.

The light device 20 may include a lamp housing 22 for securely housing the light-emitting elements 24, which may further include a lens 23 or other means for projecting the light emitted by the light-emitting elements 24 in a predetermined manner. The light-emitting elements 24 may be, for example, light emitting diodes (LEDs) or other such elements capable of emitting light for normal use and for providing illumination during a loss of power condition. In the representative embodiment, the light device 20 contains light emitting elements 24 in the form of an LED module having a plurality of LEDs 24. The plurality of LEDs 24 may be mounted on an LED substrate 25. In accordance with the present invention the LED module may include two types of LEDs to prevent the need for electronics, such as an AC/DC converter or driver, between the light device 20 and the power supply. The light device 20 may contain a plurality of AC-LEDs 24a, which can operate directly off an AC power source 44 (FIG. 4). Thus, the light device 20 has the capability of being illuminated by AC utility power 44 without converting the current. The light device 20 also contains a plurality of DC-LEDs 24b, which can operate directly off a DC power source 46 (FIG. 4). Thus, the light device 20 has the capability of being illuminated by DC power without converting the current. By utilizing dual types of LEDs 24, power is transmitted more efficiently and power is delivered more effectively without the need for intervening electronics. The operation of AC-LEDs 24a and DC-LEDs 24b in the same light device 20 may be as described in U.S. Pat. No. 9,107,269 and US publication no. 2014/0268697 both of which are hereby incorporated by reference in their entireties.

It is contemplated that the number of DC-LEDs 24b may be less than the number of the AC-LEDs 24a in order to conserve the energy delivered from the backup power supply, namely, the battery 46. According to one embodiment of the invention, the AC LEDs 24a include multiple AC LEDs 24a. The number of AC LEDs 24a is configured according to desired illumination intensity, such as, 450-799 lumens, 800-1,099 lumens, or 1,600-1,999 lumens, which is equivalent to, for example, to a 40 Watt, 60 Watt, or 100 Watt incandescent bulb. The DC LEDs 24b may be a single DC LED 24b or a small number of DC LEDs 24b to minimize the power required by the light device 20 during backup operation. Because the AC LEDs 24a comprise the majority of the LEDs 24 included in the light device 20 and because the AC LEDs 24a are powered directly via the AC power connector 42 or via minimal control and/or power conversion, the high-power operation of the light device 20 does not require the power conversion or driver devices that result in the most heating. The power conversion from the buck converter 238 (see FIG. 4) to charge the battery 46 and deliver power to the DC LEDs 24b still requires power conversion and/or device drivers that generate heat; however, these devices may operate under lower power. Although the AC LEDs 24a themselves still generate heat, the power conversion losses, and resultant heat generation, is minimized. It is contemplated that any number or configuration of the two types of LEDs 24a, 24b may be provided.

It is contemplated that the AC-LEDs 24a and DC-LEDs 24b are arranged to provide uniform distribution of light rays through the lens 23. In the representative embodiment, a single DC-LED 24b is centered on the LED substrate 25 and a plurality of AC-LEDs 24a are evenly spaced around the periphery of the LED substrate 25 to provide uniform lighting through the lens 23. It is understood that other arrangements of LEDs 24 may create a similar uniform effect consistent with the teaching of the present invention.

According to an alternative embodiment of the invention, one type of light source, such as one type of LED (e.g., either the AC LEDs 24a or the DC LEDs 24b) may receive power from both the AC power connector 42 and the battery 46. In this configuration, an AC/DC converter or driver is disposed between the power source 44, 46 requiring conversion and the LEDs 24a, 24b. In one embodiment, AC LEDs 24a are configured to receive AC power from the AC power connector 42 without the need for power conversion. The AC LEDs 24a are then configured to receive DC power from the battery 46 by converting the power to AC power. In another embodiment, DC LEDs 24b are configured to receive power from the AC power connector 42 by convening the AC power to DC power. Optionally, the DC LEDs are arranged in one or more banks where additional banks are enabled as the AC voltage increases toward a peak voltage and one or more banks are disabled as the AC voltage decreases toward a minimum voltage. A portion of the DC LEDs 24b may then receive DC power from the battery 46 via the controller 230 without conversion to AC power. In the present invention, all or a portion of the LEDs 24 may be lit via the AC power connector 42, and all or a portion of the LEDs 24 may be lit by the battery 46. This configuration helps to preserve battery power when the AC power source 44 is unavailable. It is contemplated that various configurations of AC and/or DC LEDs and various connections between an AC power source 44 and a DC power source 46 may be utilized without deviating from the scope of the invention.

The light device 20 further includes a power-coupling element 42 such as, for example, an electrical contact, prongs, or the like, configured to be selectively coupled to an external power source such as a standard outlet. In this manner, the light device 20 may be configured to operate off an external power source when primary power, such as AC power source 44, is available and then switch to the backup power source upon detection of a power loss by a signal generator 222 and signal amplifier 232. The backup power source may be a battery 46 such as one or more rechargeable batteries or standard batteries. The battery 46 may be rechargeable such that when the light device 20 is operating on primary power, the battery 46 is recharged. The battery charging circuit will be further discussed below.

Figure 17:
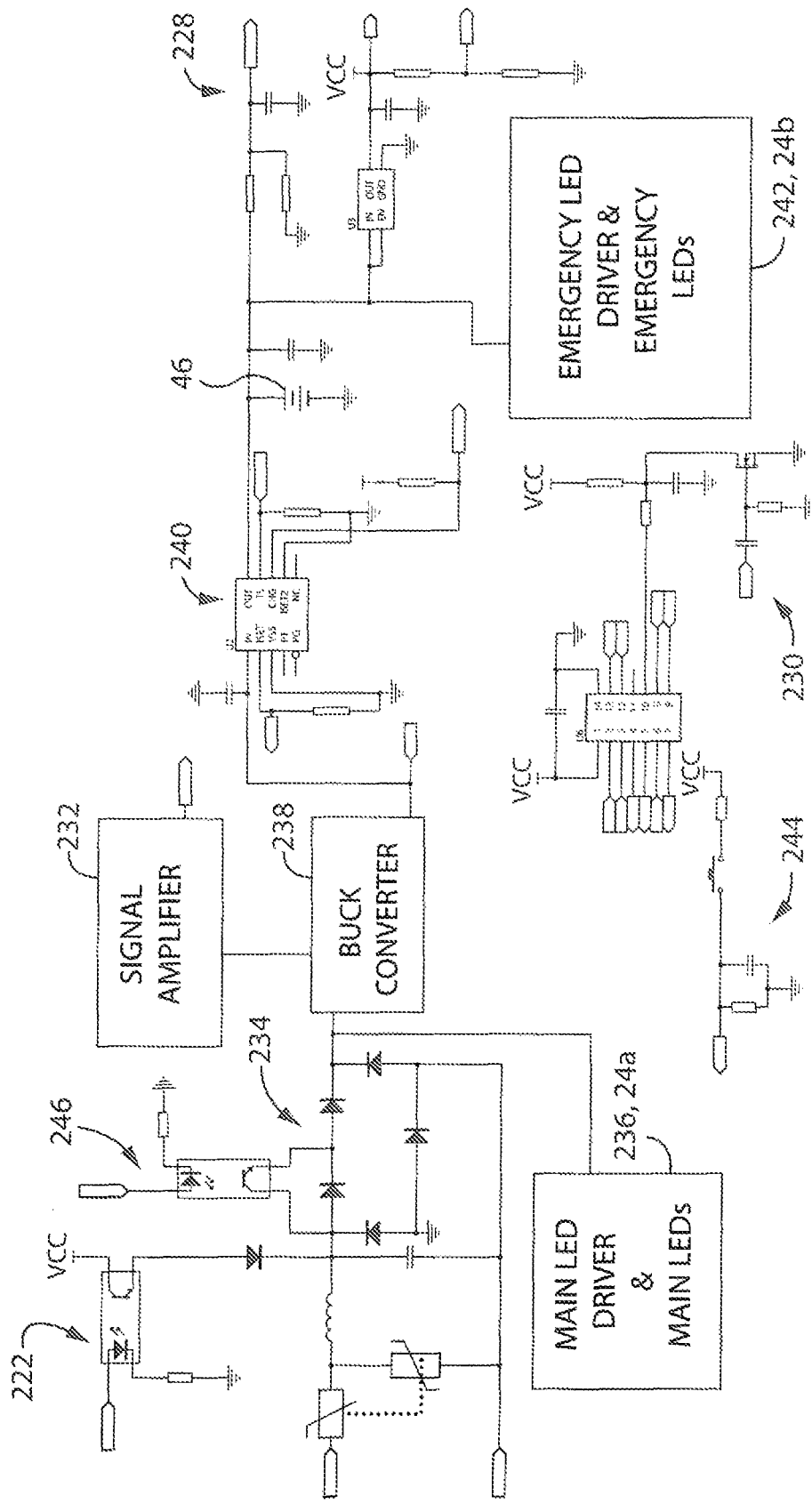
FIG. 17 is a circuit diagram according to one embodiment of the electronic arrangement of FIG. 4.
Figure 18:
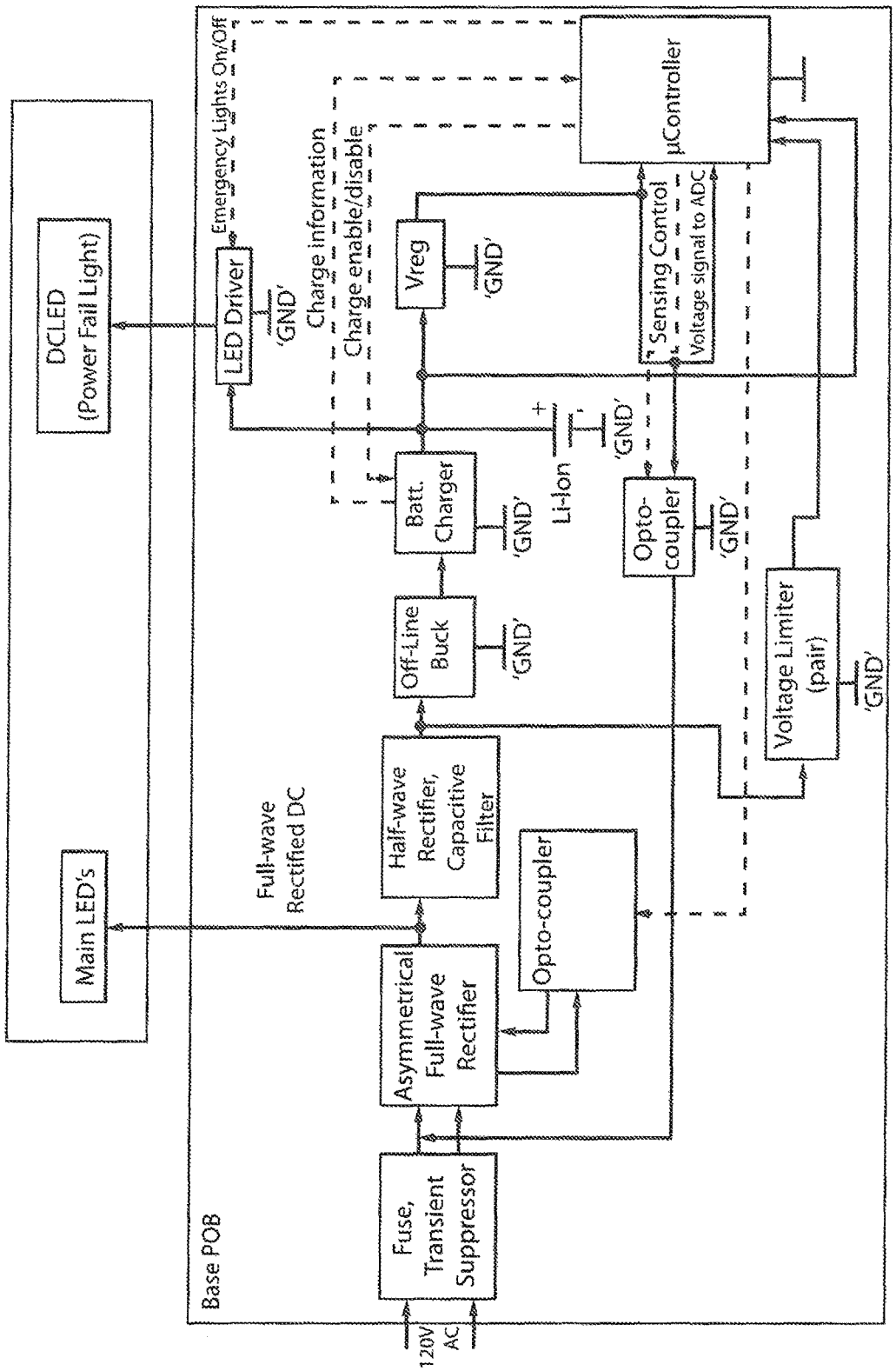
FIG. 18 is an exemplary block diagram of the power circuit board of the electronics arrangement.

The light device 20 may further include an electronics arrangement 26 to provide the necessary circuitry and electronics for operation of a controller 230, such as a printed circuit board. The electronics arrangement 26 may be housed entirely within the lamp housing 22 of light device 20. The electronics arrangement 26 may include a circuit arrangement as shown in FIGS. 4 and 17-18 for a number of different operating functions to be described in detail below.

Lamp Housing

Referring to FIGS. 1 and 2, in the representative embodiment of the light device 20 shown, the light emitting elements 24, battery 46, and electronics arrangement 26 may be located within the lamp housing 22. In one embodiment of a light device 20, the light device 20 has a separated or detached housing design to spatially remove the battery 46 from the heat emitting light emitting elements 24. In this respect, the heat generated by the light emitting elements 24 does not radiate to the battery 46 and heat the battery 46. The battery 46 is further insulated from the electronics arrangement 26, which also generates unwanted heat. As previously discussed, transfer of heat may diminish the effectiveness of the battery 46, and the stability of the electronics arrangement 26 and light emitting elements 24 which may be LEDs.

The lamp housing 22 separates the light emitting elements 24 from the battery 46 into a first portion 50 and a second portion 52, respectively. For example, in the representative embodiment, the first portion 50 may include the lens 23 and the LED substrate 25 holding the plurality of LEDs 24. The lens 23 may be an enclosure defined by a dome-shaped ceiling 80 enclosing an upper surface of the LED substrate 25 containing the LEDs 24 and scattering the light rays emitted from the LEDs 24. The ceiling 80 is supported by and enclosed by a substantially horizontal floor 82 enclosing the enclosure. The floor 82 may provide openings 94 which receive the mating ends 96 of a pair of arms 56. Also held within the enclosure may be an additional heat sink 84 located beneath the LED substrate 25 and further assisting in heat removal. The heat sink 84 may be generally circular to generally coincide with the shape of the LED substrate 25 and floor 82. The heat sink may be, e.g., an aluminum disk or other heat conducting material, which may dissipate the heat from within the LEDs 24.

The first portion 50 is spaced from the second portion 52. The second portion 52 may include a closure 86 coupled to a base 88. The closure 86 is a generally circular, substantially planar layer forming a lid over an upper generally circular opening of the base 88 to enclose the base 88. The base 88 is a generally tapered housing with a generally cylindrical construction tapering to a narrowed neck 51 and attached to the power-coupling element 42 at a distal end. The closure 86 may provide arm holders or covers 57 which generally receive and at least partially encircle arms 56 extending upwardly from the base 88. Together, arms 56 and arm holders 57 define passages through which wires can be routed between first portion 50 and second portion 52.

The base 88 may contain the electronics arrangement 26, an insulating insert 53, and a battery compartment 48 holding the battery 46 therein. The electronics arrangement 26 may be a substantially planar layer with some outwardly extending elements, such as is conventional for a PCB-type construction. The electronics arrangement 26 may be held adjacent to and at least partially within the insulating insert 53. The insulating insert 53 may be a bowl-shaped component having a curved wall 90 extending upwardly from a generally circular floor 92 and forming a cavity 54 within the curved wall 90. The insulating insert 53 is sized to fit snugly within the walls of the base 88. The insulating insert 53 may be made of heat resistant thermoplastic or other insulating material and the cavity 54 provides space for the electronics arrangement 26 therein.

The battery 46 may be housed within the battery compartment 48 found within the neck 51 of the lamp housing 22 providing a narrowed connector between an upper region of the base 88 and the power-coupling element 42. The battery compartment 48 is positioned between the insulating insert 53 and the power-coupling element 42. The battery compartment 48 provides a battery cover 58 enclosing the compartment 48 from an opening in the neck 51 allowing access to the battery compartment 48 by a user. The battery cover 58 includes a coupling arrangement 66, which attaches to a mating arrangement 64 of the compartment 48 to enclose the compartment 48. When the cover 58 is attached, the compartment 48 defines a volume sized for holding the battery 46.

When in use, the battery 46 is installed between the opposing battery contacts 62 to maintain the battery 46 in an operable position. The battery contacts 62 may be compression springs, cantilever type springs, flat contact spring, wire with connector or other battery contact types known in the art. Thus, when the cover 58 is installed, the battery 46 is secured within the compartment 48. The battery 46 is easily replaced by removing the compartment cover 58. When the cover 58 is removed, the user may remove the battery 46 from the battery contacts 62 and replace with a new or recharged battery 46. The cover 58 is re-installed by placing the cover 58 over the compartment 48 so that the mating arrangement 64 and coupling arrangements 66 lock into place. It is contemplated that the mating arrangement 64 and coupling arrangement 66 may be any mating arrangement known in the art. For example, the coupling arrangements 64, 66 may be a slot and groove arrangement in which slots of the cover 58 slide into a groove of the mating arrangement 64. A fastening latch may lock the cover 58 into position over the compartment 60. It is contemplated that many other types of cover arrangements may be used that are known in the art. It is also contemplated that the cover 58 may only be removed by sliding the cover 58 downward toward the power-coupling element 42. In this respect the user must remove the lamp housing 22 from the attached light fixture in order to allow access to the battery compartment 48. In this respect, the battery compartment 48 may provide a safety feature that prevents tampering with the battery compartment 48 when power is being delivered to the light device 20. It is further contemplated that the coupling arrangements 64, 66 may not require screws or tools, as desired, to open or install the cover 58.

The first portion 50 of the lamp housing 22 is mounted to and spaced from the second portion 52 by the plurality of arms 56, e.g., two or three arms, which extend between the first portion 50 and the second portion 52. The arms 56 may extend upward from the base 88, for example 0.5-2 inches, and couple to the openings 94 formed within the floor 82. The arms 56 may be equally spaced around a perimeter of the first portion 50 and second portion 52 to connect the openings 94 with the mating ends 96 of arms 56. It is contemplated that the mating ends 96 of arms 56 and openings 94 may be coupled by a slot and groove arrangement and a fastening latch as known in the art.

Figure 3:
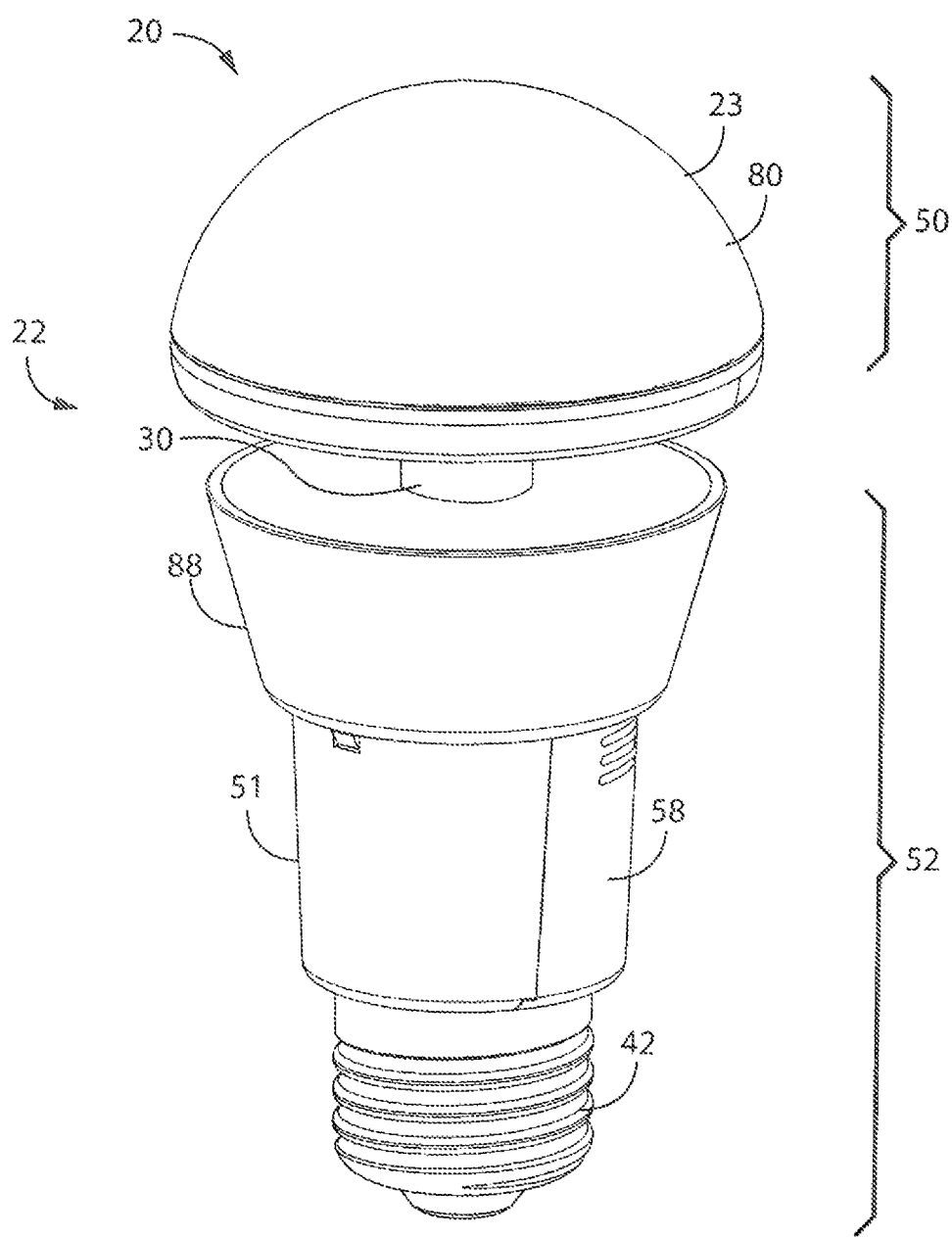
FIG. 3 is an isometric view of the light device of the present invention showing a third embodiment of the light housing with a single column between the first and second separated parts of the housing.

Referring to FIG. 3, in an alternative embodiment, a single column 30, for example centered between the first portion 50 and the second portion 52, may also couple the first portion 50 and second portion 52 with or without the arms 56 present. The single column 30 may be about 0.25-1 inch diameter to provide the necessary structural support.

As contemplated, the arms 56 (or column) separate the LEDs 24 from the battery 46 by an air gap 55 created therebetween. The air gap 55 acts as a natural insulator between the LEDs 24 and the battery 46/electronics arrangement 26. The arms 56 (or column) have passages that accommodate the necessary wires and the like to extend therein and provide electrical communication between the first portion 50 and the second portion 52. Therefore, the lamp housing 22 provides an orientation independent solution to heat convection by separating the battery 46 from the LEDs 24 regardless of the orientation of the light device 20.

Figure 2A:
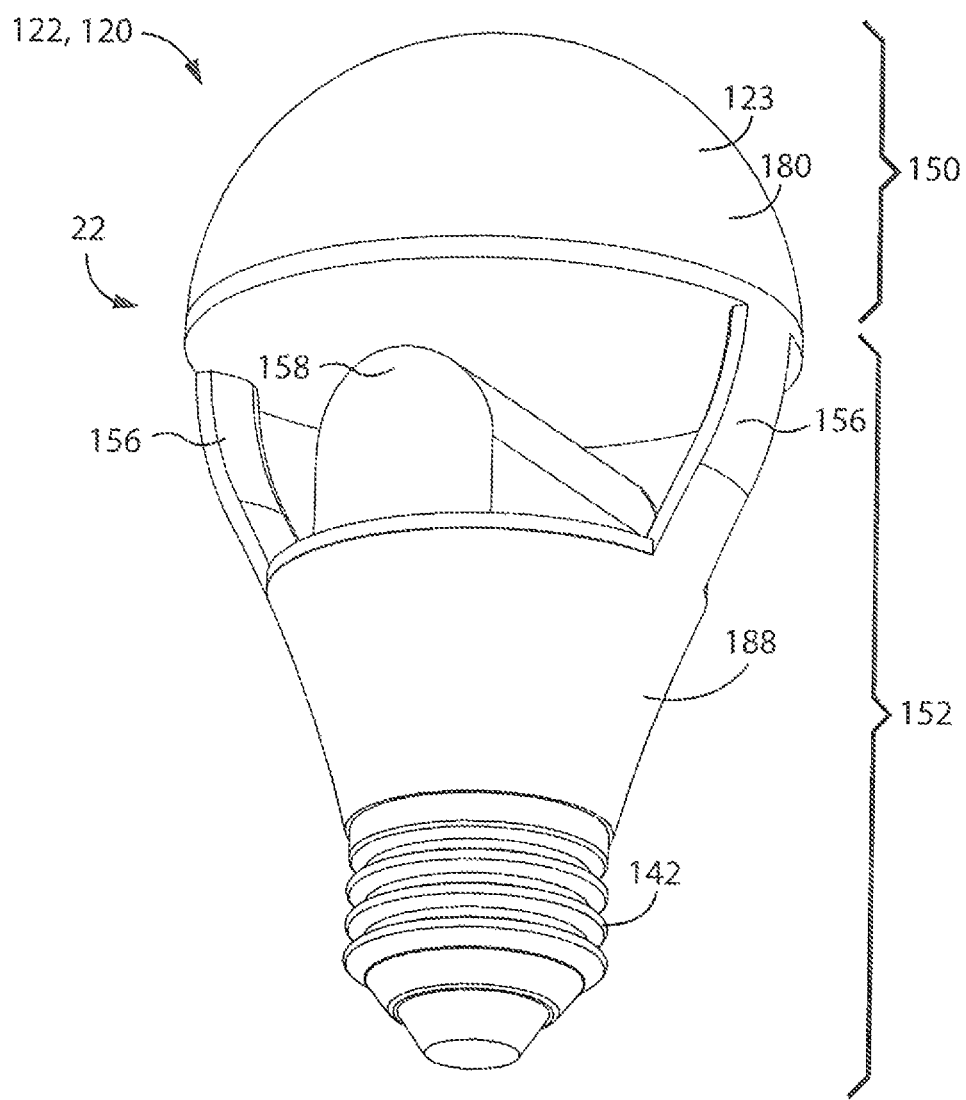
FIG. 2A is an isometric view of the light device of the present invention showing a second embodiment of the light housing with the battery between the first and second separated parts of the housing.
Figure 2B:
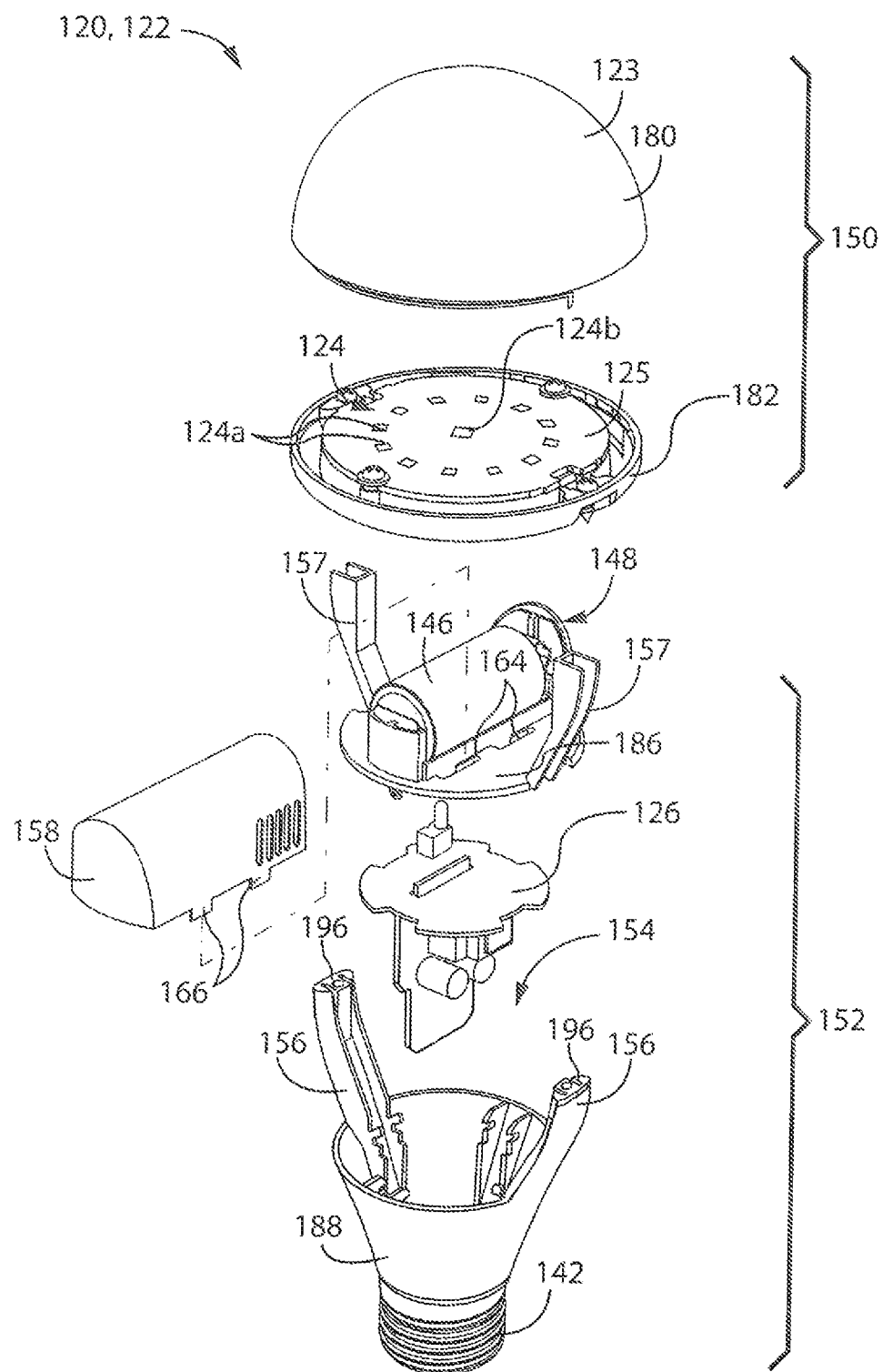
FIG. 2B is an exploded view of the light device of FIG. 2.

Referring now to FIGS. 2A and 2B, in an alternative embodiment of the lighting device shown at 120, a battery compartment 148 is located between the light emitting elements 124 and the electronics arrangement 126 instead of within the neck 151 of the lighting device 120. Elements of the lighting device 120 of this embodiment that correspond to the light device 20 of the first embodiment are designated by the same reference numeral, incremented by 100. A description of many of these elements is abbreviated or even eliminated in the interest of brevity.

The battery compartment 148 is defined by a cover 158 and battery contacts 162 coupled to closure 186 extending along a plane. The cover 158 has a coupling arrangement 166, which attaches to a mating arrangement 164 of the closure 186 to enclose the battery compartment 148. When the cover 158 is attached, the battery compartment 148 defines a volume sized for holding the battery 146. An upper surface of the closure 186 has outwardly extending battery contacts 162 thereon for electrically connecting the battery 146, and the mating arrangement 164 for coupling the cover 158 thereon.

The closure 186, which is shown as generally circular, is sized and positioned to extend over and enclose an opening of the base 188, which is shown as generally circular, so that the electronics arrangement 126 is not exposed to the environment. This prevents the ingress of dirt and dust into the electronics compartment 154. The physical barrier provided by the closure 186 also prevents users from accessing the interior of the base 188 and its contents. The closure 186 also acts as a physical and thermal barrier, and thermally separates the battery 146 from any heat generated by the electronics arrangement 126. The battery compartment 148 may be made of a heat resistant thermoplastic to prevent heat transfer.

The battery 146 is easily replaced by removing the compartment cover 158. To remove the cover 158, the cover 158 slides outward, substantially parallel to the plane of the closure 186. The cover 158 is re-installed by sliding the cover 158 inward, substantially parallel to the plane of the closure 186, until the mating arrangement 164 and coupling arrangements 166 lock into place.

It is contemplated that other lamp housing configurations are possible that spatially separate the battery 146 from the lighting elements 24 and the battery 146 from the electronics arrangement 126 in order to keep the battery 146 at a cool temperature. This may be done with a combination of insulating layers, heat sinks, and air gaps of the lamp housing as taught above and as understood in the art.

Emergency Light Operation

FIG. 4 is a schematic diagram of the circuitry of the electronics arrangement 26. The first set of LEDs (i.e., the AC LEDs 24a) is configured to receive power 44 via the AC power connector 42. According to the illustrated embodiment, the AC power connector 42 is a threaded contact (see FIGS. 1-3) compatible with a standard socket for an incandescent bulb, although it is understood that any other type of contact arrangement may be employed. The AC power connector 42 is an input to a rectifier section 234. The rectifier section 234 includes, for example, diodes configured to convert the AC input to a half or a full-wave rectified output or to provide switch sensing circuitry (i.e. asymmetrical bridge rectifier) as will be described further below. It is further contemplated that a capacitance, including one or more capacitors connected in series and/or parallel, may be included in the rectifier section 234 to reduce the magnitude of ripple on the rectified voltage. The controller 230 receives a signal from the signal amplifier 232 to determine light switch position based upon the switch sensing circuitry of the rectifier section 234. A signal or current amplifier 232 is used to enhance and alter the voltages at the sensing mechanism in order to aid in switch position detection.

An optional LED driver circuit 236 is illustrated, where the LED driver circuit 236 may, for example, connect a portion of or all of the AC LEDs 24a to the rectified voltage as a function of the magnitude of voltage. According to yet another embodiment of the invention, the rectifier section 234 may be omitted and the LED driver circuit 236 may be used to connect a first portion of the AC LEDs 24a to the input voltage as a function of a first polarity of the AC power input and a second portion of the AC LEDs 24a to the input voltage as a function of a second polarity of the AC power input.

The controller 230 receives a signal from the signal amplifier 232 to determine whether AC power 44 is being supplied via the AC power connector 42. The controller 230 may also provide control signals and/or receive feedback signals from the LED driver 236 to enable/disable different banks of AC LEDs 24a as a function of the magnitude of voltage present. Optionally, the LED driver 236 may be configured to directly enable/disable different banks of AC LEDs 24a as a function of the magnitude of voltage present.

Referring still to FIG. 4, the second set of LEDs (i.e., the DC LEDs 24b) is configured to receive power from a DC power source. According to the illustrated embodiment, the battery 46 is provided as the DC power source. The battery 46 is included within the housing 22 of the light device 20 as described above (see FIGS. 1-3). A buck converter 238 receives the AC power 44, or rectified AC power, as an input and converts it to a DC voltage suitable for charging the battery 46.

A battery charge circuit 240 controls the power flow between the output of the buck converter 238 and the battery 46. Optionally, the buck converter 238 and the battery charge circuit 240 may be combined as a single circuit. The controller 230 receives the temperature signal 229 from the temperature sensor 228 and controls the battery charge circuit 240 as a function of the temperature signal 229. The control will be discussed in more detail below. An LED driver 242 is provided to supply power from the battery 46 to the DC LEDs 24b.

Figure 5:
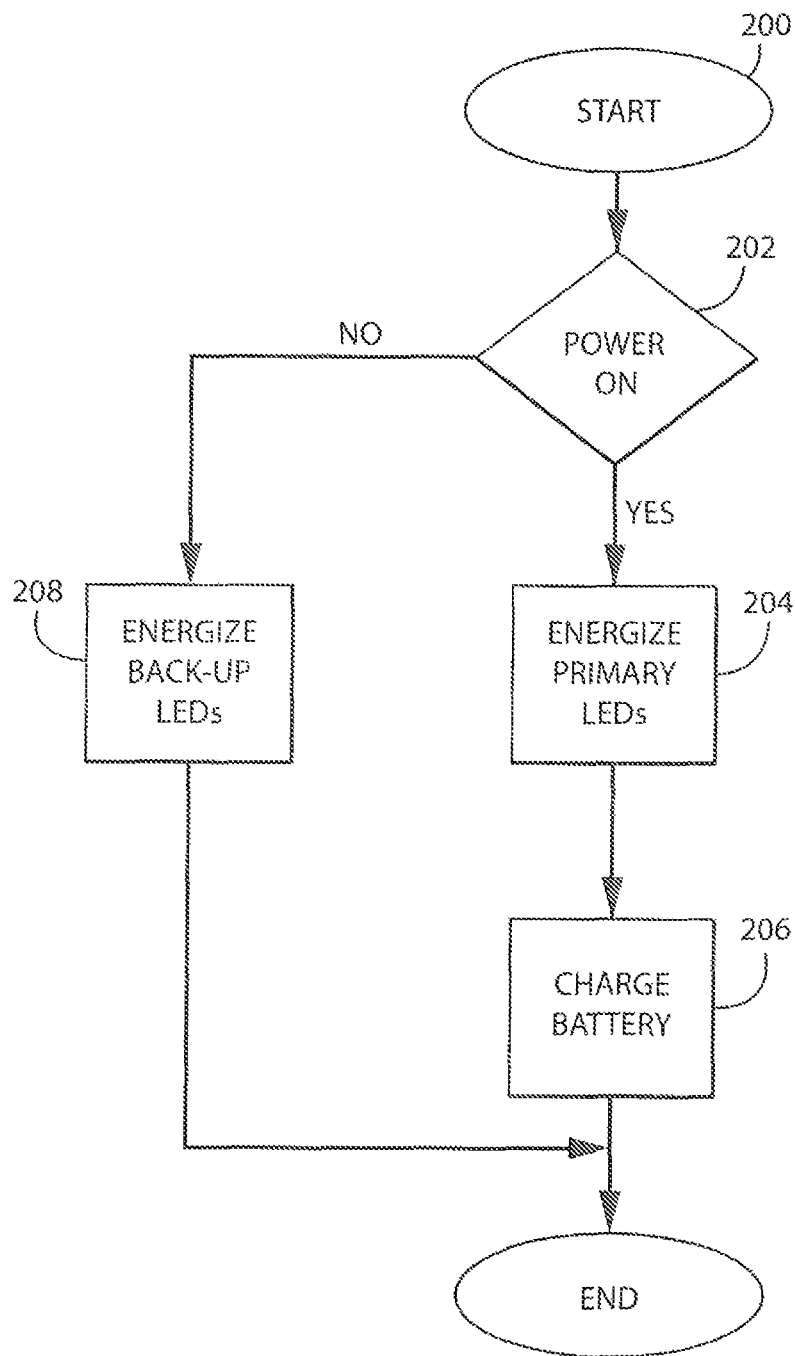
FIG. 5 is a flow chart showing operation of the primary LEDs and back-up LEDs and battery charging within the lighting device based on a power condition.

Referring to FIG. 5, in operation, when AC power source 44 is present, the light device 20 may be configured to be powered from the primary power source 44 via a traditional wall outlet, socket or fixture, or in the alternative, as desired, the light device 20 may not be connected to a primary power source and configured to only illuminate upon occurrence of a power outage wherein the light device 20 is powered only via the backup power source 46. During a power outage, the light device 20 is configured to operate off the backup power source 46. It is understood that the power delivered by the standard outlet may be mains electricity delivering an AC power supply and that the power delivered by the battery 46 may be a DC power supply.

The controller 230 operates generally according to the steps illustrated in FIG. 5. The controller 230 monitors the signal supplied by the signal amplifier 232 and controls the operating mode of the light device 20, as shown generally by step 200. At step 202, the controller 230 determines if the primary power source is on. According to one embodiment of the invention, the primary power source may be a utility power grid. Optionally, the primary power source may be a generator or other alternate energy source. Typically, the primary power source is connected via a distribution panel in a building and a switched connection, such as a wall switch, to selectively provide power to the light device 20. If the primary power source is on, the light device 20 operates in a first operating mode during which the primary LEDs are energized, as shown in step 204. During the first operating mode, the controller 230 may also deliver power from the first power source to the battery 46 via the buck converter 238 and the battery charge circuit 240, as shown in step 206. If the primary power source is off, the controller 230 may begin operating the light device 20 in a second operating mode. During the second operating mode, the controller 230 delivers power from the battery 46 to the back-up LEDs, as shown in step 208. According to one embodiment of the invention, the light device 20 automatically enters the second operating mode when the primary power source is removed. Optionally, a control signal may be provided to the light device 20, for example, via a wireless communication connection, to initiate operation in the second operating mode.

It is contemplated that the signal amplifier 232 may monitor a voltage, a current, or a combination thereof and generate a signal corresponding to the monitored condition. It is contemplated that the loss of power condition may be detected at the light device 20 via power supplied at the power-coupling element 42. The signal amplifier 232 may be operably coupled to the electronics arrangement 26, and the signal from the signal amplifier 232 generates an indication that power to the light device 20 is either present or has been lost. The electronics arrangement 26 may then be configured to selectively operate the light device 20 to generate light via the AC LEDs 24a or the DC LEDs 24b as a function of the signal from the signal amplifier 232. When power is present, the AC LEDs 24a are lit and the electronics arrangement 26 keeps the DC LEDs 24b off. When power is lost, the AC LEDs 24a turn off and the electronics arrangement 26 operates the DC LEDs 24b from the backup power source, such as the battery 46. The backup power source may be external to the light device 20 or built into the light device 20 as described above.

Loss of Power Sensing

Referring to FIG. 4, the signal amplifier 232 of the electronics arrangement 26 of the light device 20 may also detect a light switch position in addition to detecting a loss of power condition as described above. When there is loss of power, the controller 230 may be configured so as to be able to distinguish between a power loss event where no utility power is available, and power loss event due to a light switch that may be operable via a wall light switch or some other means whereby utility power is still available but not present at the light device 20 due to the switch being in the off position.

It is contemplated that the light switch position may be detected at the light device 20 via signals received at the power-coupling element 42. The signal generator 222 may be operably coupled to the electronics arrangement 26, and the signal from the signal amplifier 232 allows the controller 230 to determine whether the light switch position is either ON or OFF. The signal generator 222 is an element or circuit that is capable of supplying a desired signal to the power-coupling element 42 in order to sense wall light switch position. This signal is altered by the wall light switch position and received and amplified by the signal amplifier 232 to be used by controller 230. When the light switch position is ON, it is understood that the user desires the light device 20 to be lit, and when the light switch position is OFF, it is understood the user desires the light device 20 to be unlit. Any type of light switch may be detected, e.g., wall switches, lamp pull cords, turn switches, etc.

Figure 6:
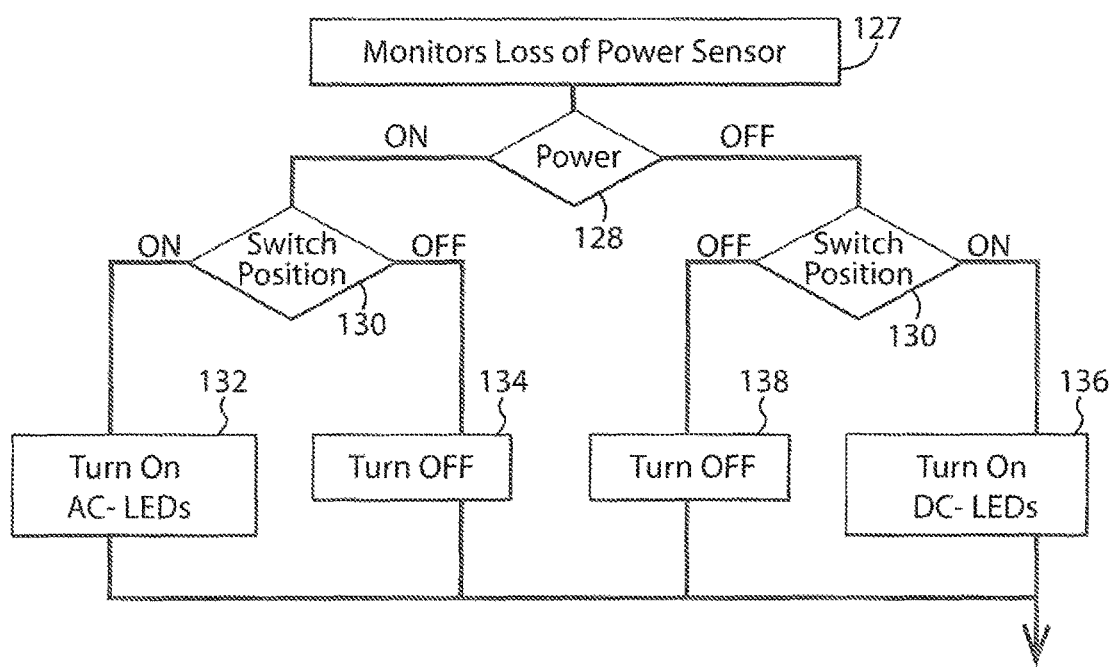
FIG. 6 is a flow chart showing operation of primary LEDs and back-up LEDs based on a power condition and switch position.

The controller 230 operates generally according to the steps illustrated in FIG. 6. The electronics arrangement 26 may be configured to selectively operate the light device 20 to generate light via the AC LEDs 24a or the DC LEDs 24b as a function of the loss of power signal and the light switch position signal from the signal amplifier 232, as shown at step 127. At step 128, the controller 230 determines if power is present, for example, if utility power is being delivered to the fixture, outlet, etc. Then, at step 130, the controller determines the light switch position, for example, of a wall light switch. When the controller 230 determines that AC power 44 is present and the light switch position is ON, the primary or AC LEDs 24a are on and the electronics arrangement 26 keeps the DC LEDs 24b off, as seen at step 132. It is possible that the DC LEDs 24b may be on along with the AC LEDs when power is present. The controller 230 may still allow for battery charging when AC power 44 is present. When the controller 230 determines that power is present and the light switch position is OFF, however, the AC LEDs 24a and DC LEDs are kept off, as seen at step 134. The controller 230 may still allow for battery charging when AC power 44 is present. When the controller 230 determines that primary power is lost and the light switch position is ON, the AC LEDs 24a turn off and the electronics arrangement 26 turns on the DC LEDs 24b from a backup power source, such as the battery 46, as seen at step 136. When the controller 230 determines that primary power is lost and the light switch position is OFF, however, the AC LEDs 24a and DC LEDs 24b are kept off or turned off, as seen at step 138.

Figure 7:
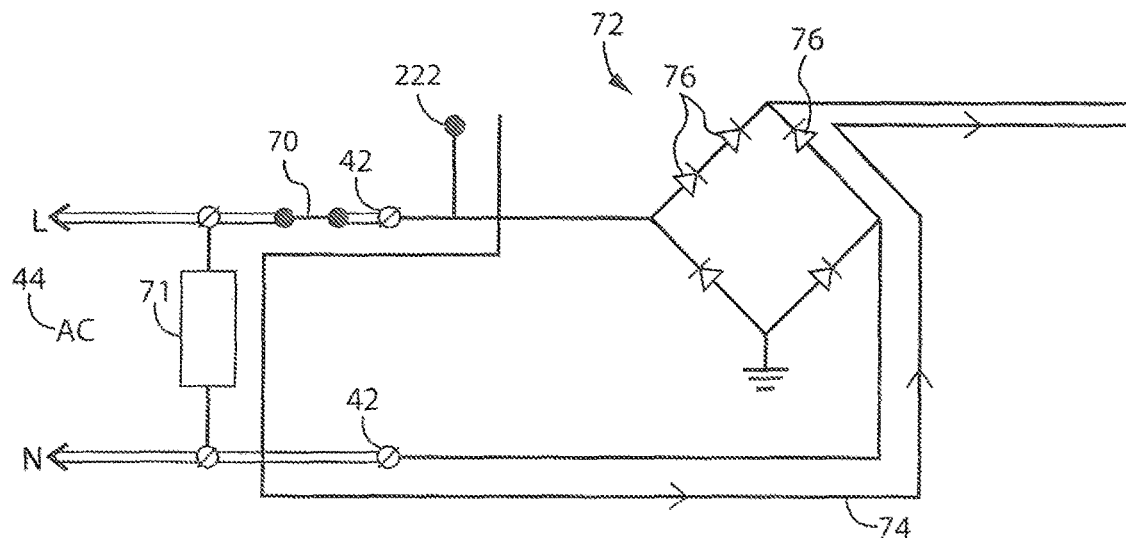
FIG. 7 is a schematic diagram of the sensing circuitry showing an asymmetrical bridge rectifier for detecting switch position and showing current flowing through a path with a closed switch.
Figure 8:
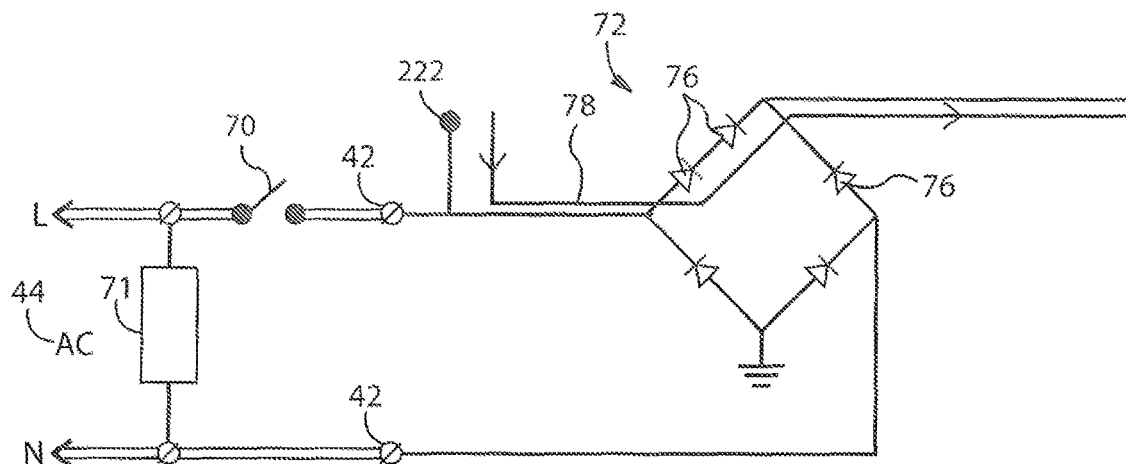
FIG. 8 is a schematic diagram of the sensing circuitry showing an asymmetrical bridge rectifier for detecting switch position and showing current flowing through a path with an open switch.

In order to determine the switch position during a power outage condition, the light device 20 utilizes switch-sensing circuitry. This allows the controller 230 to distinguish between a power outage and light switch OFF condition. Referring to FIGS. 4 and 7-8, the switch sensing circuitry includes an asymmetrical bridge rectifier 72, a part of rectifier section 234. The signal generator 222 is an input to the power-coupling element 42 and the asymmetrical bridge rectifier 72, and the signal amplifier 232 determines the light switch position by sensing the voltage difference or drop when current flows through one of two paths created by the asymmetrical bridge rectifier 72. The varying voltage drops in the asymmetrical bridge rectifier 72 may be created in many ways, for example, by including diodes or resistors in the separate pathways.

As understood in the art, current that passes through a diode will cause the forward voltage (i.e., the voltage drop through the diode) to fall across it. For example, the voltage drop across silicon diodes is generally 0.6-0.7V and for germanium diodes is generally 0.3-0.4V. By positioning diodes in the current path, between the input (line) and output (positive) of the bridge rectifier, the voltage drop can be selectively increased. Thus, by sending a current (or voltage) pulse through an asymmetrical bridge rectifier, one can determine which of two paths the current has traveled by sensing the amount of voltage drop which differs between the two current paths.

Referring to FIG. 7, when there is a power outage condition and the light switch position is ON, the electrical switch 70 is closed (i.e., any electrical load connected to the AC power source 44 is connected to the power-coupling element 42) and current may travel from the signal generator 222 to the signal amplifier 232 through the asymmetrical bridge rectifier 72 through a first current path 74. Although two pathways are open through the asymmetrical bridge rectifier 72, the current will flow through the path of least resistance with respect to voltage drop, and thus, will choose to flow through a path having the least number of diodes 76, i.e., the first current path 74 made available by the closed electrical switch 70, instead of an alternative path having more diodes. The first current path 74 contains a first number of diodes 76, e.g., one diode, causing the voltage drop to correspond to current passing through one diode.

Referring to FIG. 8, when there is a power outage condition and the light switch position is OFF, the electrical switch 70 is open preventing current from traveling to the signal amplifier 232 through the asymmetrical bridge rectifier 72 from the signal generator 222 through a first current path 74, and instead only allowing current to pass from the signal generator 222 to the signal amplifier 232 along a second current path 78 of the asymmetrical bridge rectifier 72 which is distinct from the first current path 74. The second current path 78 contains a second number of diodes 76, e.g., two diodes, which is more from the number of diodes 76, e.g., one diode, existing in the first current path 74. However, the second current path 78 is the only current path available for the current to travel when the electrical switch 70 is open.

It is contemplated that the asymmetrical bridge rectifier 72 as shown may be configured differently, for example, by changing the number or position of the diodes or resistors without deviating from the scope of the invention.

Referring to FIG. 4, in operation, the signal amplifier 232 may detect the voltage drop resulting from current flowing through the asymmetrical bridge rectifier 72. From the sensed voltage drop, the controller 230 will determine the light switch position. This may be determined by providing a range of acceptable voltage drops for each condition, or alternatively by creating threshold voltage drops for each condition. Because properties of semiconductors vary with temperature, calibration curves may be implemented to adjust the change in voltage drops at different temperatures.

In an alternative embodiment, the controller 230 may determine light switch position by temporarily converting the asymmetrical bridge rectifier 72 into a symmetric bridge by adding an electronically controllable switch, relay, or optocoupler 246 (see FIG. 17) across one of the diodes in the second current path 78. This eliminates the additional diode from the second current path 78, therefore making the voltage drops across the first 74 and second 78 paths the same, i.e., both paths have one diode. The voltage drop is measured across the newly created symmetric bridge. Then the electronically controllable switch 246 is removed to measure voltage drop in the asymmetrical bridge, as shown in FIGS. 7 and 8. The voltage drop across the newly created symmetric bridge and asymmetrical bridge are compared. If a difference is detected between the voltage drop with the symmetric bridge and the asymmetrical bridge, then it can be determined that the switch 70 is closed (as seen in FIG. 7). In this condition, the current flows through one diode in both the symmetric bridge and the asymmetrical bridge. If the voltage drop of the asymmetric bridge and the symmetric bridge are the same, then the switch 70 is open (as seen in FIG. 8). In this condition, the current flows through one diode in the symmetric bridge (the additional diode is omitted by the electronically controllable switch) and through two diodes in the asymmetric bridge.

If it is detected that the current is flowing through the first current path 74 shown in FIG. 7, indicating that the light switch position is ON, then the emergency light source, e.g. the DC LEDs 24b, will turn on. If it is detected that the current is flowing through the second current path 78 shown in FIG. 8, indicating that the light switch position is OFF, then the emergency light source, e.g. the DC LEDs 24b, will remain off.

It is contemplated that the switch-sensing circuitry may be used in connection with any type of electrical load, such as fans, pumps, heaters, or other appliances, and may not be limited to operation of a lamp or light.

Adapter for Non-Sensing Lamps

Figure 9:
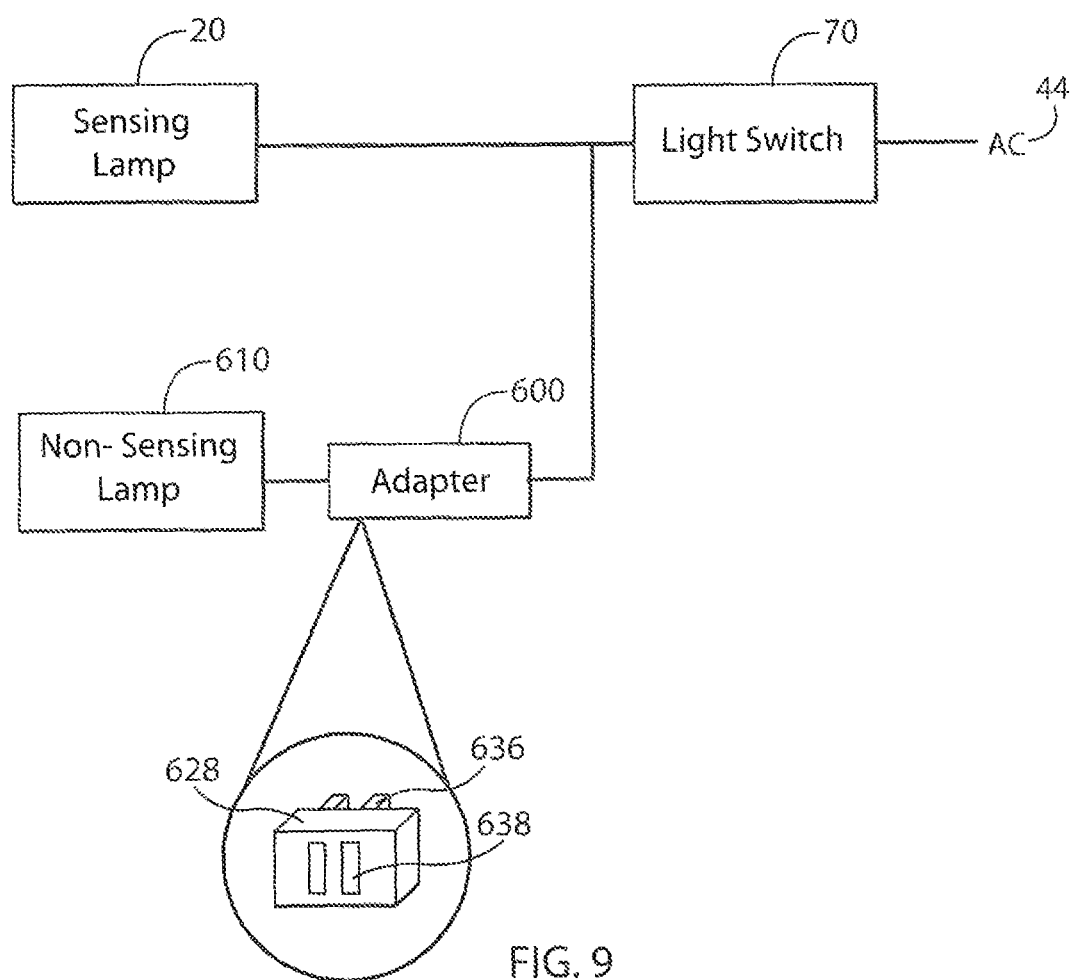
FIG. 9 is a schematic diagram showing the arrangement of an adapter between the non-sensing light device or non-sensing load and an AC power source in parallel with the sensing light device.

Referring to FIG. 9, in multi-lamp fixtures, for example, holding CFL, LED or incandescent bulbs, it may be desirable to install only one or a portion of the lamps with a light device 20. However, when a plurality of lamps is installed in parallel, the presence of non-sensing lamps may interfere with the sensing circuitry of the light device 20.

The power outage sensing circuitry of the light device 20 is designed to sense the wall switch position using electrical devices 71 that are connected to the AC power 44. The electrical devices 71 may be disconnected from the AC power 44 via light switch 70. Non-sensing lamps 610 that are connected in parallel to light device 20, for example, in the same fixture, may be falsely recognized as electrical devices 71. This interference may occur if the non-sensing lamps 610 are Ohmic e.g., incandescent bulbs, halogen bulbs, or other Ohmic loads.

Figure 11:
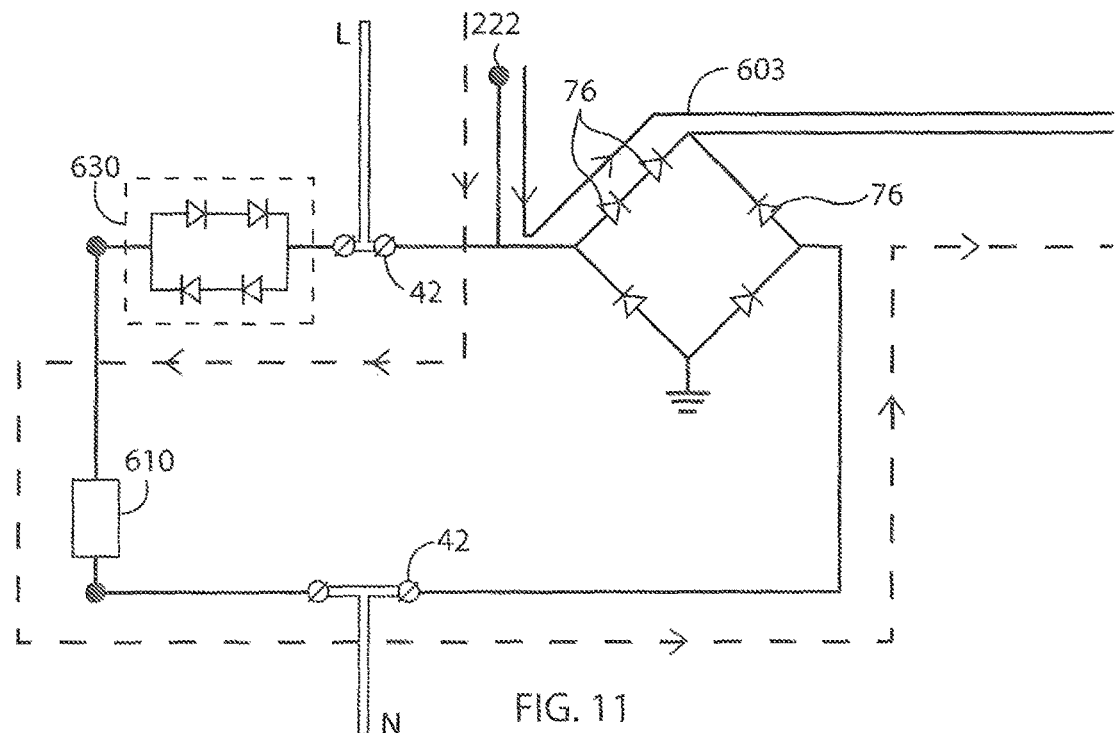
FIG. 11 is a schematic diagram of the sensing circuitry showing the adapter installed in parallel with the asymmetrical bridge rectifier and showing a current path directly through the asymmetrical bridge and an alternative path through the parallel non-sensing lamp with adaptor.

Referring to FIGS. 9 and 11, an adapter 600 having a plurality of diodes 602, e.g., four diodes, may be installed on the non-sensing lamp or lamps 610 to make the non-sensing lamps 610 compatible with the sensing circuitry of the light device 20. In one embodiment, as shown in FIG. 9, the adapter 600 may be a plug-in adapter 628 installed between the non-sensing lamp 610 and the AC power source 44, where the light device 20 is installed in parallel. The plug-in adapter 628 may include prongs 636 for plugging into a wall outlet where the light device 20 is to be connected. The plug-in adapter 628 may also have apertures 638 on its back end for prongs of the non-sensing lamp 610 to be inserted. The plug-in adapter 628 is plugged into the wall outlet and the light device 20 is plugged into the apertures 638.

Figure 10:
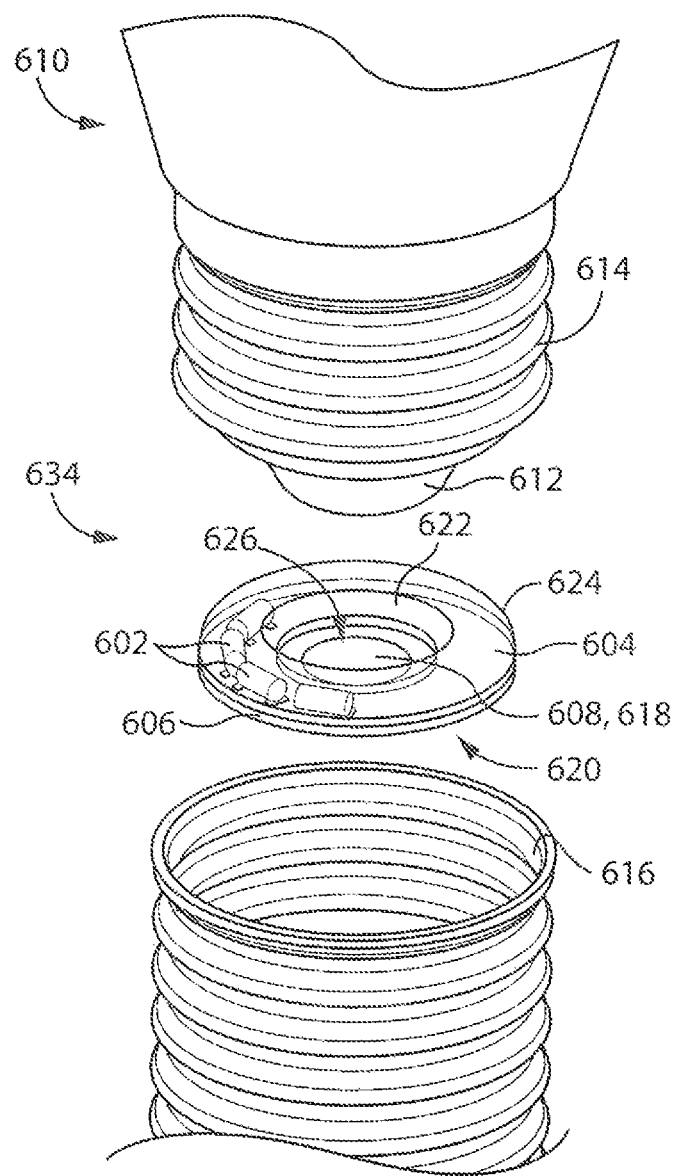
FIG. 10 is an isometric view of the adapter according to one aspect of the present invention being installed between an electrical tip contact of a non-sensing lamp and the power source.

In an alternative embodiment, as shown in FIG. 10, the adapter 600 may be in the form of a donut shaped adapter 634 installed directly to the non-sensing lamp base 614. The donut shaped adapter 634 is installed between the non-sensing lamp 610 and the AC power source 44, where light device 20 is installed in parallel. In this respect, the donut shaped adapter 634 is defined by a donut shaped housing 604 having an inner circumference 622 and an outer circumference 624. The inner circumference 622 provides an opening 626 that is sized to receive an electrical tip contact 612 of the non-sensing lamp base 614. The outer circumference 624 has a diameter less than or equal to a diameter of the non-sensing lamp base 614. In the central opening 626 of the housing 604 is a conductive material, such as a metal copper piece 608 providing an electrical output 618 and input (hidden from view) at the top and bottom sides, respectively, of the housing 604.

Referring still to FIG. 10, enclosed within the housing 604 is an arrangement of four (or more) diodes 602 in a certain configuration (see FIG. 11), held on a metal power circuit board 606. Thus, current that flows in a first path has to flow through two additional diodes, thus increasing the voltage drop for this path and making second current path more desirable. AC power 44 that is supplied to the non-sensing lamp 610 remains almost unaltered, thus allowing the current to flow in both directions as well as keeping almost the same voltage amplitude. The housing 604 may be a mold plastic or silicone or similar material that surrounds and protects the diodes 602. It is contemplated that the housing 604 has a thin profile so as to not interfere with the normal installation of the non-sensing lamp base to a power source 616.

The donut shaped adapter 634 is installed on the non-sensing lamp base 614 by optionally placing an adhesive, for example, glue or other adhesive, on the sides of the electrical tip contact 612 of the non-sensing lamp base 614. The tip contact 612 is then inserted within the inner circumference 622 of the housing 604 to mate with the opening of the housing 604. The sides of the electrical tip contact 612 and the inner edges of the housing 604 contact to provide an adhesive attachment. The tip of the tip contact 612 contacts the copper piece 608 of the top side of the housing 604 to provide an electrical contact with the output 618. When the non-sensing lamp base 614 is coupled to an electrical power source 616, power flows from the input 620, i.e., the copper piece on a bottom side of the housing, through the diode bridge, and out through the output 618, i.e., the copper piece on an upper side of the housing. Although the donut shaped adapter 634 achieves the function of allowing an electric current to pass in one direction only, it is contemplated that other methods may be employed to create the same result.

FIG. 11 is an exemplary schematic diagram of the configuration 630 of the adapter 600, which may apply to the embodiments shown in FIGS. 9 and 10. When the adapter 600 is used with non-sensing lamp 610 installed in parallel, additional resistance provided by a diodes in adapter 600 is placed within a first path 601 including a first number of diodes 76, e.g., three diodes. A second path 603 containing less than the first number of diodes 76, e.g., two diodes, will draw the current so that it does not need to overcome the first path 601 containing three diodes 76. In this respect, the current will ignore the non-sensing lamp 610 and a current path therethrough. This eliminates the false sensing which occurs if there is no adapter 600 by forcing the current to bypass the path with the non-sensing lamp 610.

Figure 12:
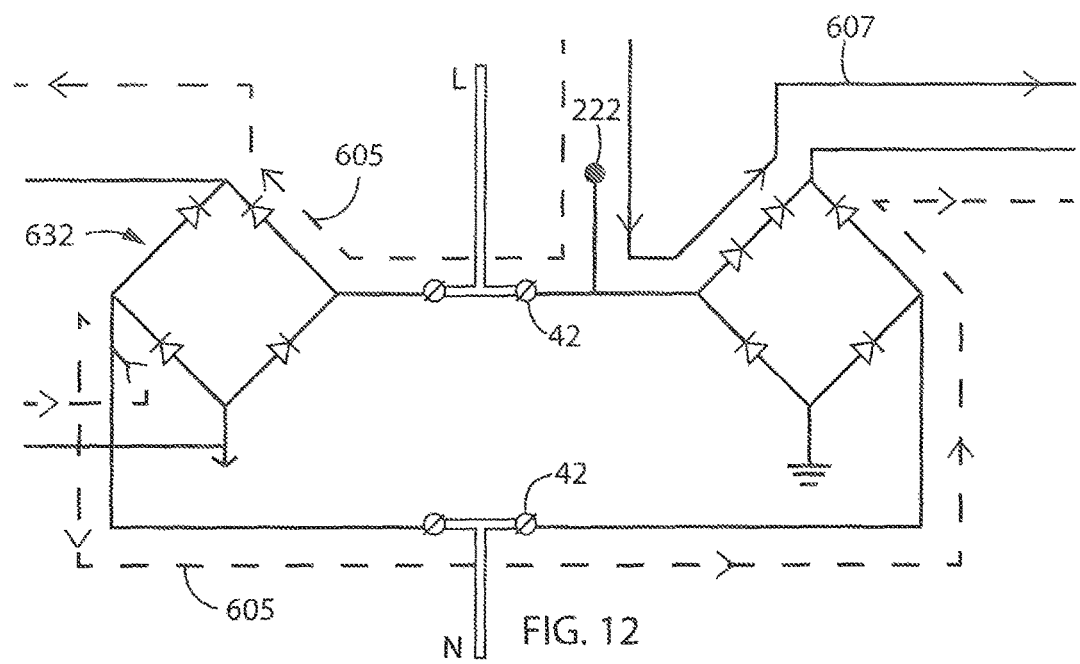
FIG. 12 is a schematic diagram of the sensing circuitry showing a bridge rectifier built into a non-sensing lamp and showing a current path directly through the asymmetrical bridge and an alternative path through the parallel non-sensing lamp with the built-in rectifier bridge.

In an alternative embodiment of the present invention, an adapter 600 on the non-sensing lamps 610 is not necessary because the sensing circuitry is built into the circuitry of the non-sensing lamps 610. Referring to FIG. 12, when an adapter 600 is not needed, for example, when the non-sensing lamps 610 has a built-in diode bridge 632, similar to FIG. 11, the current will follow a second path 607 containing two diodes 76 so that it does not need to overcome a first path 605 containing three diodes 76 created by the built-in diode bridge 632. Therefore, the adapter 600 with a diode bridge 630 or non-sensing lamps 610 with a built-in diode bridge 632 eliminates the false sensing by making the non-sensing lamps 610 installed in parallel essentially invisible to the sensing circuit.

Adaptive Battery Charging

Referring to FIG. 4, the electronics arrangement 26 of the light device 20 may also include a temperature sensor 228 for detecting a battery temperature. The temperature sensor 228 may be operably coupled to the electronics arrangement 26 that is operable to receive an indication from the temperature sensor 228 of the temperature of the battery 46 or of the ambient environment surrounding the battery 46. The electronics arrangement 26 may then be configured to selectively turn off charging of the battery 46 from a primary power source or control the charging rate of the battery 46 from the primary power source in order to control overheating of the battery 46.

Figure 13:
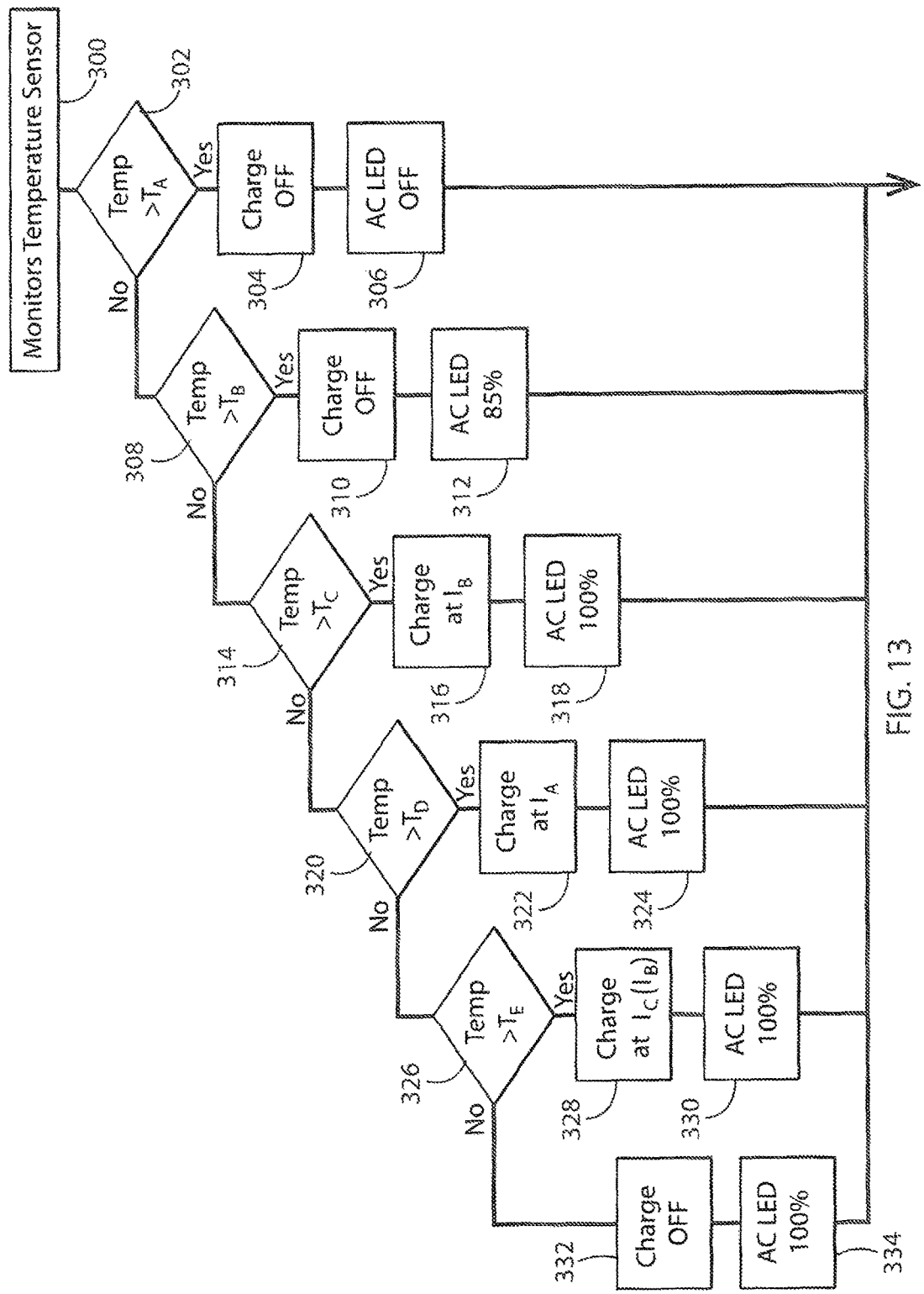
FIG. 13 is a flow chart showing charging of the battery and power output to the AC LEDs based upon a battery temperature.

The controller 230 operates generally according to the steps illustrated in FIG. 13. The controller 230 monitors the temperature sensor 228 as shown in step 300. At step 302, the controller 230 determines if the temperature is greater than a first predetermined temperature, Ta. The conditions to determine the occurrence of an event may be configured and stored in memory in controller 230. If the controller 230 determines that the temperature is greater than first predetermined temperature, Ta, then the battery 46 may be considered unsafe for operation and the controller 230 will disable the buck converter 238 and the battery charge circuit 240 to disable charging of the battery 46, as shown at step 304. The controller 230 will also turn the AC LEDs off to prevent heating of the battery 46 any further, as shown at step 306. According to one embodiment of the invention, the first predetermined temperature is selected at a point above which potential damage to the battery may occur if charging continues. The first predetermined temperature, Ta, may be, for example, between about 60-80° C. The first predetermined temperature may representatively be substantially 70° C. If the controller 230 determines that the temperature is not greater than the first predetermined temperature, Ta, then the controller 230 proceeds to step 308.

At step 308, the controller 230 determines if the temperature is less than a second predetermined temperature, $T_B$. If the controller 230 determines that the temperature is greater than the second predetermined temperature, $T_B$, then the battery may be considered unsafe for charging but safe enough to allow operation of the lighting elements at a reduced level, and the controller 230 will disable the buck converter 238 and the battery charge circuit 240 to disable charging of the battery 46, as shown at step 310. Optionally, the second predetermined temperature may be selected at a point above which the efficiency of charging the battery is significantly reduced. The second predetermined temperature may be, for example, between about 50-70° C. The third predetermined temperature may representatively be substantially 60° C. The controller 230 may allow operation of the AC LED at a reduced brightness, such as 85% of its maximum power output, as shown at step 312. If the controller 230 determines that the temperature is not less than the second predetermined temperature, $T_B$, then the controller 230 proceeds to step 314.

At step 314, the controller 230 compares the temperature to a third predetermined temperature, Tc. If the controller 230 determines that the temperature is greater than the third predetermined temperature, Tc, then the temperature is within an acceptable range of temperatures for charging, but approaching the second predetermined temperature, $T_B$, at which the controller 230 disables charging. Within this range of temperatures, the battery charge circuit 240 may allow charging of the battery 46, but at a reduced rate. The third predetermined temperature may be, for example, between 30-50° C. The third predetermined temperature may representatively be substantially 40° C. The battery charge circuit 240 may regulate the current flow such that a second amplitude of current, Ib, is supplied to the battery 46, as shown in step 316. The second amplitude of current may be selected, for example, between about 0.1-0.3 C or 0.3 C. The controller 230 may allow operation of the AC LED at full brightness, such as 100% of its maximum power output, as shown in step 318. If the controller 230 determines that the temperature is less than the third predetermined temperature, Tc, then the controller 230 proceeds to step 320.

At step 320, the controller 230 compares the temperature to a fourth predetermined temperature, $T_D$. If the controller 230 determines that the temperature is greater than the fourth predetermined temperature, $T_D$, then the battery temperature is within a preferred operating range, and the controller 230 is configured to charge the battery 46 at a maximum rate Ia. The fourth predetermined temperature may representatively be selected, for example, between about 0-20° C. The third predetermined temperature may representatively be substantially 10° C. The battery charge circuit 240 may regulate the current flow such that a first amplitude of current, Ia, is supplied to the battery 46, as shown in step 322. The first amplitude of current may be selected, for example, between about 0.4-0.6 C or 0.5 C. The controller 230 may allow operation of the AC LED at full brightness, such as 100% of its maximum power output, as shown in step 324. If the controller 230 determines that the temperature is less than the fourth predetermined temperature, Tc, then the controller 230 proceeds to step 326.

At step 326, the controller 230 compares the temperature to a fifth predetermined temperature, $T_E$. Just as the charging efficiency of battery 46 is reduced if the temperature is too high, the charging efficiency of a battery 46 is similarly reduced if the temperature is too low. The temperature may be low due to the environmental conditions, such as in an outdoor light fixture. The temperature may also be low to indicate that the battery is fully charged. The fifth predetermined temperature may representatively be selected, for example, between about −10 to 10° C. The fifth predetermined temperature may representatively be substantially 0° C. If the controller 230 determines that the temperature is greater than the fifth predetermined temperature, $T_E$, then the temperature is within an acceptable range of temperatures for charging, but approaching the fifth predetermined temperature, $T_F$, at which the controller 230 stops charging. Within this range of temperatures, the battery charge circuit 240 may continue to charge the battery 46, but at a reduced rate. The battery charge circuit 240 may regulate the current flow such that a third amplitude of current, Ic, is supplied to the battery 46, as shown in step 328. Optionally, the current flow may be an amplitude of current between Ib and Ic. The third amplitude of current may be selected, for example, between about 0-0.2 C or 0.1 C. The controller 230 may allow operation of the AC LED at full brightness, such as 100% of its maximum power output, as shown in step 330. If the controller 230 determines that the temperature is less than the fifth predetermined temperature, $T_E$, then the battery temperature is too low to charge safely, or may be already fully charged, and the controller 230 will disable the buck converter 238 and the battery charge circuit 240 to disable charging of the backup power source 46, as shown at step 332. Optionally, the controller 230 may disable only the charge circuit 240 and continue operating the buck converter 238. Switching losses in the buck converter 238 may generate heat allowing the light device 20 to warm to a sufficient temperature to begin charging the battery 46. The controller 230 may allow operation of the AC LED at full brightness, such as 100% of its maximum power output, as shown at step 334.

Figure 14:
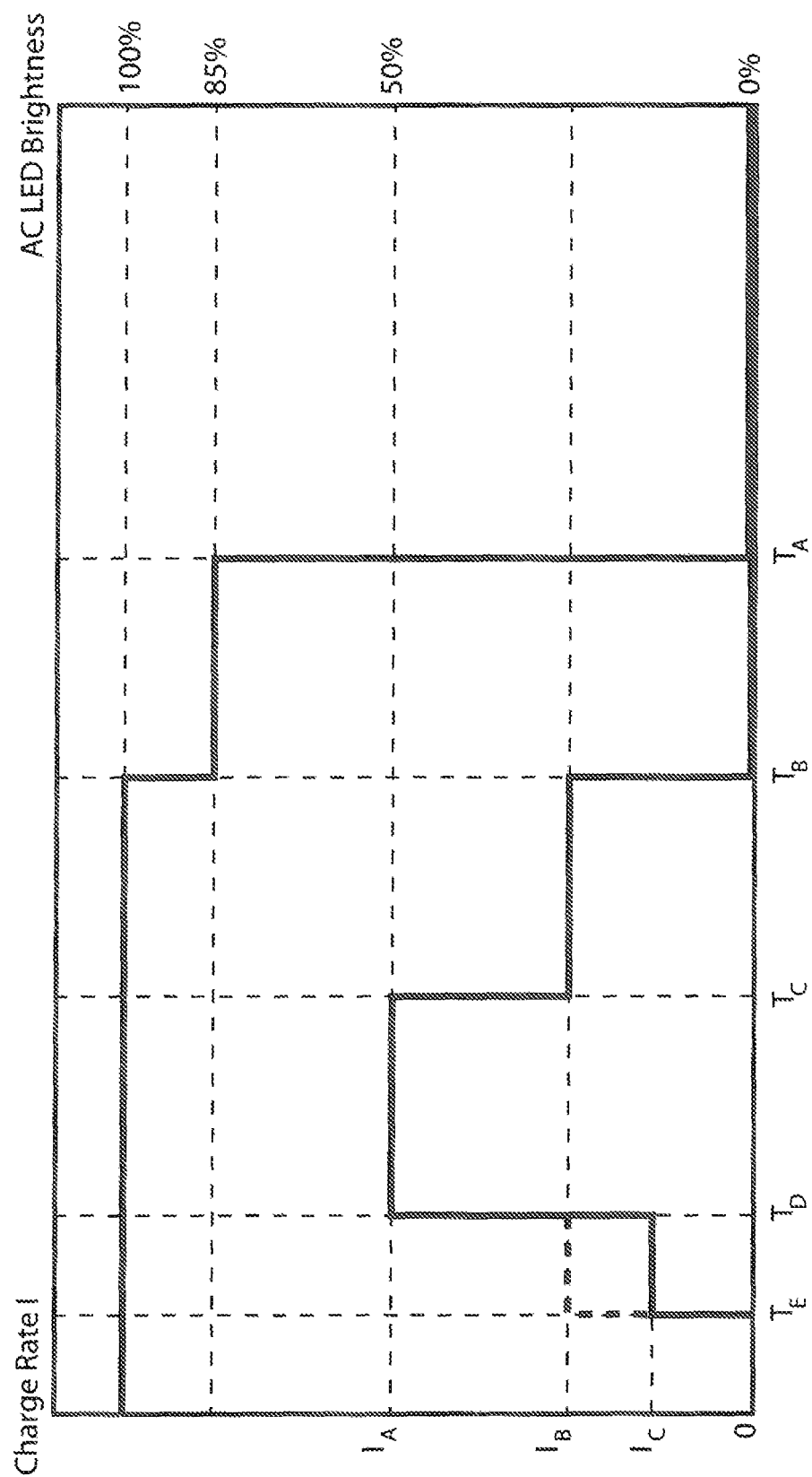
FIG. 14 is a graph showing charge rate as a function of battery temperature and power output to the AC LEDs as a function of battery temperature.

Referring to FIG. 14, it is contemplated that $T_A$ is higher than $T_B$, $T_B$ is higher than $T_C$, $T_C$ is higher than $T_D$, and $T_D$ is higher than $T_E$. The first predetermined temperature, $T_A$, is associated with the temperature at which charging may be harmful to the battery 46. The second predetermined temperature, $T_B$, is associated with the temperature above which efficiency of battery charging is reduced. The third predetermined temperature, $T_C$, is associated with the temperature below which the efficiency of battery charging is at its highest. The fourth predetermined temperature, $T_D$, is associated with the cut-off point at which the battery charging efficiency is reduced. The fifth predetermined temperature, $T_E$, is associated with the temperature at which charging efficiency may be harmful to the battery 46.

When the temperature is below $T_C$ (but above $T_D$) the battery 46 is considered to be at a low enough temperature to receive a higher charging rate Ia. When the temperature is above $T_E$ (but below $T_D$) or above $T_C$ (but below $T_B$) the battery 46 is at a lower or higher temperature, respectively, and receives a lower charging rate Ib or Ic, or somewhere in between Ib and Ic, to reduce additional heating of the light device 20 resulting from charging and/or to reduce damage to the battery and to allow the light device 20 to continue charging the battery 46 over an increased operating range.

The controller 230 may be configured to adjust the magnitude of current provided to the battery 46. It is contemplated that charging rate Ia is higher than charging rate Ib and charging rate Ib is higher than charging rate Ic. According to one embodiment of the invention, the first amplitude, Ia, the second amplitude, Ib, and the third amplitude, Ic, of current are maximum amplitudes of current for charging within the defined temperature ranges. For example, no current may be delivered at temperatures above $T_B$ which may be harmful to the battery. A magnitude of current at Ic, Ib or between Ic and Ib may be delivered between temperatures $T_C$ and $T_B$. A magnitude of current at Ia may be delivered between $T_D$ and $T_C$, the optimum temperature for charging. A magnitude of current at Ic, Ib or between Ic and Ib may be delivered between temperatures $T_E$ and $T_D$. Lastly, no current may be delivered at temperatures below $T_E$ which may be harmful to the battery.

Thus, the controller 230 utilizes operating points of the light device 20 during which the temperature is lower to charge the battery 46 at a greater rate and other operating points of the light device 20 during which the temperature is higher to continue charging the battery 46 but reduce the amount of heat resulting from the charging operation, for example, from the buck converter 238 and the battery charge circuit 240. It is further contemplated that still additional set points and charging rates may be defined to provide an increased level of flexibility in charging the battery 46 and to increase the efficiency at which the battery 46 is charged.

Throughout the charging process, the controller 230 monitors the level of charge in the battery 46. If the level of charge indicates the battery 46 is fully charged, the controller 230 disables the battery charge circuit 240, completing the battery charging. If the controller 230 detects the level of charge on the battery 46 is approaching a full charge, the controller 230 may decrease the amplitude of current provided to the battery 46 below the maximum amplitude for the current temperature.

The controller 230 may also be configured to adjust the magnitude of current or power provided to the LEDs to change the LED brightness or power output. For example, the LEDs may be turned off at temperatures above $T_A$ where heat from the LEDs may harm the battery. The LED brightness may be at 85% between $T_A$ and $T_B$ where the LEDs may be lit at a reduced output while the temperature is still over heated. The LED brightness may be at 100% at temperatures below $T_B$ where the temperature is safe enough to not harm the battery.

Adaptive LED Dimming

In at least one construction of the light device 20, the lighting device may be configured so that as the battery power is expended, the number of operable light-emitting elements 24 and/or intensity of the light-emitting elements 24 is reduced. The adaptive charging shown in FIGS. 13-14 may be used in combination with adaptive dimming, as mentioned above, to control the battery temperature and battery power expenditure.

Figure 15:
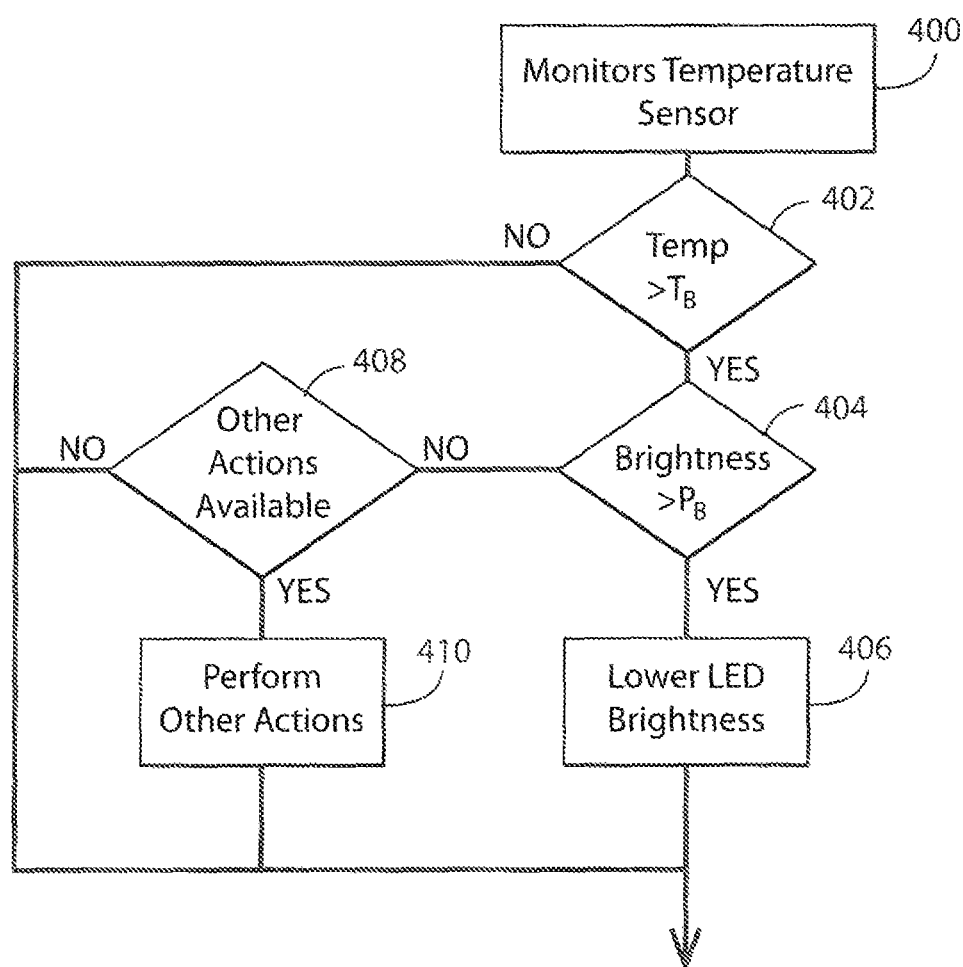
FIG. 15 is a flow chart showing power output to LEDs and other actions to decrease battery temperature as a function of temperature and minimum power output.

Referring to FIG. 15, the amplitude of current delivered to the AC LEDs 24a may be decreased if the temperature of the battery or lamp housing gets too high. The current is decreased to reduce the power output and the amount of heat generated from the AC LEDs 24a themselves. For example, the AC LEDs 24a may be "dimmed" by a predetermined percentage when the temperature of the battery 46 or the ambient environment within the lamp housing 22 is above a predetermined threshold temperature, $T_B$. It is contemplated that either or both of the AC LEDs 24a and DC LEDs 24b may be "dimmed" to accomplish temperature control or energy conservation.

The controller 230 operates generally according to the steps illustrated in FIG. 15. The controller 230 monitors the temperature sensor 228 as shown in step 400. At step 402, the controller 230 determines if the temperature is above a predetermined threshold temperature, $T_B$. According to one embodiment of the invention, the predetermined threshold temperature, $T_B$, is selected at a point above which potential damage to the battery may occur if lighting continues. Optionally, the predetermined threshold temperature, $T_B$, may be selected at a point above which the efficiency of charging the battery 46 is significantly reduced. The conditions to determine the occurrence of an event may be configured and stored in memory in controller 230. If the controller 230 determines that the temperature is not greater than the predetermined threshold temperature, $T_B$, then normal lighting continues. If the controller 230 determines that the temperature is greater than predetermined threshold temperature, $T_B$, then the controller 230 will proceed to step 404. At step 404, the controller 230 determines if the LEDs 24 are above a predetermined minimum brightness, $P_B$. According to one embodiment of the invention, the predetermined minimum brightness is the minimum power output that still provides visual light. If the controller 230 determines that the LEDs 24 are above the minimum brightness, $P_B$, then the brightness is decreased in the one or more LEDs 24, such as by decreasing the amplitude of current delivered to the AC LEDs 24a as shown in step 406. The brightness may be decreased by a predetermined percentage or may be decreased incrementally. According to one embodiment of the invention, the brightness may be decreased by an amount that is substantially unnoticeable by the human eye. In an alternative embodiment of the invention, the brightness may be decreased by a minimum amount needed to protect the battery and/or LEDs 24.

If the LEDs 24 are not above the minimum rightness, $P_B$, then the controller 230 will proceed to step 408. At step 408, the controller 230 determines if there are other actions that may be taken to reduce the temperature, such as turning the LEDs 24 off, changing the battery 46 charging rate, or turning off charging to the battery 46, as previously shown in FIGS. 13-14. If other actions are available or have not yet been taken, then some or all of the actions are performed as shown at step 410. If no other processes are available, the controller 230 will resume normal lighting conditions.

The light device 20 may be configured to illuminate all or a subset of the light-emitting elements 24 at full or partial power. In addition, the light-emitting elements 24 or a subset thereof, may be flickered, sequenced, repeatedly turned on and off, etc. In this manner, the light device 20 may be configured to provide illumination while still conserving power to prolong the battery life and extend the duration of operation. It is also contemplated that in another construction of the light device 20, the number and intensity of the LEDs 24 may also be configured so that the brightness output of the light device 20 is substantially similar during the activation of either the AC-LEDs 24a or the DC-LEDs 24b, or combination of both, so that a change in the lighting source goes substantially unnoticed by the human eye.

Battery Level Testing

Figure 16:
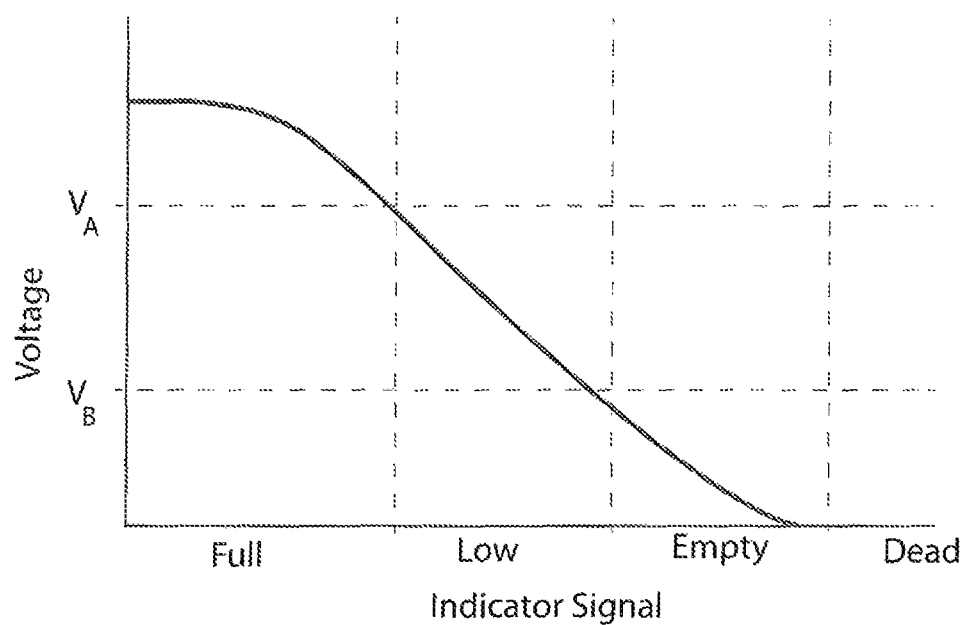
FIG. 16 is a graph showing voltage as a function of battery indicator signal.

Referring to FIG. 16, the light device 20 may be configured to detect a low battery condition, such that upon occurrence of a low battery level the light device 20 may be configured to notify an operator that the battery 46 needs to be recharged and/or replaced. The light device 20 may be configured to notify the operator via an audible or visual indication such as through the transmission of a sound or the illumination of an indicator light or in any other such manner known in the art.

The electronics arrangement 26 of the light device 20 may include a battery level circuit 244 (see FIG. 17) for detection of battery life. In one embodiment, the light device 20 may include a test button 68 (see FIG. 1), which may be pressed by the user to receive an indication of battery life. The test button 68 may be located on the closure 86 of the light device 20. When the test button 68 is activated, the battery level circuit will detect the voltage level under the load of the battery 46. If the voltage measured is above a first predetermined threshold value, Va, the indicator will alert the user to the battery 46 being in a full state. If the voltage detected from the battery is below the first threshold value, Va, but above a second threshold value, Vb, the indicator will alert the user to the battery 46 being in a low state. When the voltage detected from the battery 46 is below the second threshold value, Vb, but there is enough energy remaining to provide in indication signal, the indicator will alert the user to the battery 46 being in an empty state. If there is not enough energy in the battery 46 to provide an indicator signal, then no indication may be provided to the user and the user will consider the battery 46 "dead". The indicator may be in the form of blinking or flickering lights of the lamp where the number of blinks indicates a battery life condition.

While the battery level circuit may be activated by the positive act of the user, e.g., pressing a button, to conserve energy it is contemplated that the battery level circuit may be running without activation of the user and may alert the user to a low battery condition without any user intervention. In this respect, the battery life indicator may be activated actively by the user or passively without user intervention. It is also contemplated that the battery level circuit may detect battery level from other measurements besides voltage, for example, a current, impedance, or a combination of known measurements.

Example Circuit Diagrams

FIG. 17 is an exemplary circuit diagram consistent with the schematic diagram of the electronics arrangement in FIG. 4, and showing several of the components described in detail above. For example, the circuit diagram provides an AC power input to the rectifier section 234. The rectifier section is defined by the asymmetrical bridge rectifier 72. The electronically controllable switch 246 may be installed across one of the diodes of the asymmetrical bridge rectifier 72 in order to detect the switch position as described above. The signal amplifier 232 may detect the voltage drop across the asymmetrical bridge rectifier 72 to determine a switch position as well as detect whether AC power is being supplied via the AC power connector 42. The signal amplifier 232 may be used to enhance and provide an accurate comparison of voltages at the sensing mechanism/signal generator 222 in order to determine switch position. The buck converter 238 receives the AC power, or rectified AC power, as an input and converts it to a DC voltage suitable for charging the battery 46. The battery charge circuit 240 controls the power flow between the output of the buck converter 238 and the battery 46. The controller 230 receives the switch position signal and an AC power signal from signal generator 222 and determines whether to operate the AC LEDs 24a and/or DC LEDs 24b, which are powered by the main LED driver 236 and emergency LED driver 242, respectively. The controller 230 may also receive a temperature signal from the temperature sensor 228 and control the battery charging circuit 240 as a function of the temperature signal. The controller 230 may also receive a battery level signal from the battery level circuit 244 to provide an indication of battery level.

FIG. 18 is an exemplary block diagram of the power circuit board of the electronics arrangement 26 consistent with the present invention.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system to detect a power loss condition, the system comprising:
 a light housing having
  a power coupling element configured to establish an electrical connection to a first power source, wherein the first power source is an input to an asymmetrical bridge rectifier providing a first current flow path and a second current flow path wherein the first current flow path and the second current flow path have varying voltage drops;
 a first light source operatively connected to the power coupling element and configured to selectively emit light in a first operating mode;
 a battery configured to supply power to a second light source in a second operating mode;
 a signal amplifier configured to monitor a power condition at the first power source and send a first signal indicating a first power source condition and to monitor a light switch position by sensing a voltage drop across a current path when current flows through the first current flow path or the second current flow path and send a second signal indicating a light switch condition; and
 a controller in communication with the power coupling element, the battery, the first light source, and the second light source and configured to receive first and second signals generated by the signal amplifier, wherein the controller uses the first and second signals from the signal amplifier to determine operation of the first light source and the second light source.

2. The system of claim 1 wherein the first light source is on if (i) the first power source condition is on and the light switch condition is on, and the first lit source is off if (ii) the first power condition is off and the light switch is off or (iii) the first power source condition is on and the light switch condition is off.

3. The system of claim 2 wherein the second light source is on if (iv) the first power source condition is off and the light switch condition is on, and the second light source is off if (v) the first power source condition is off and the light switch condition is off.

4. The system of claim 3 wherein the second light source is on if (vi) first power source condition is on, and the second light source is off if (vii) the first power source condition is on and the light position condition is off.

5. The system of claim 1 wherein current flows through the first current flow path when the light switch position is on and current flows through the second current flow path when the light switch position is off.

6. The system of claim 5 wherein the first current flow path provides a first number of diodes and a second current flow path provides a second number of diodes distinct from the first current flow path.

7. The system of claim 5 wherein the first current flow path provides a first number of resistors and a second current flow path provides a second number of resistors distinct from the first path.

8. The system of claim 1 wherein the first light source and the second light source are LEDs.

9. The system of claim 1 further comprising a second light device coupled to the first power source and an adaptor element having a set of diodes providing resistance in a third path.

10. A method of determining operation of a back-up light source, the method comprising the steps of:
providing a light device having
a power coupling element configured to establish an electrical connection to a first power source,
a first light source operatively connected to the power coupling element and configured to emit light in a first operating mode;
a battery configured to supply power to a second light source in a second operating mode;
an electronic circuit providing
a switch having, an open and closed position and interrupting current flow through a first path in an open position,
a signal amplifier configured to monitor a power condition at the first power source and send a first signal indicating a power source condition and to monitor a switch position via an assymetrical bridge rectifier and in response thereto send a second signal indicating a switch position condition,
a controller in communication with the power coupling element and the first light source, and configured to receive the first and second signal generated by the signal amplifier;
sending a current pulse through the asymmetrical bridge rectifier; and
receiving the first and second signals to determine whether the first power source is on or off and whether the switch is open or closed.

11. The method of claim 10 wherein the asymmetrical bridge rectifier receives current input from the first power source and provides a first path and a second path wherein the first path and the second path provide different voltage drops.

12. The method of claim 11 wherein the first path provides a first resistance and a second path provides a second resistance greater than the first path.

13. The method of claim 12 wherein current flows through the first path when the switch position is closed and current flows through the second path when the switch is open.

14. The method of claim 13 wherein a light switch opens and closes the switch, and wherein the switch position is closed when the light switch is on and the switch position is open when the light switch is off.

15. The method of claim 14 further comprising the step of installing a second light device coupled to the first power source and an adaptor element having a diode set providing resistance in a third path.

16. A lighting device comprising:
a power coupling element configured to establish an electrical connection to a first powersource;
a first light source operatively connected to the power coupling element and configured to selectively emit light in a first operating mode; and
a battery configured to supply power to a second light source in a second operating mode;
wherein the lighting device has a first housing portion comprising the first and second light sources and a second housing portion comprising the battery, wherein the first portion is spatially separated from the second portion by an air gap exposed to an external environment and traversed by a support member extending between the first portion and second portion to couple the first portion and second portion.

17. The device of claim 16 further comprising a battery level sensor and a battery level indicator, wherein the battery level sensor detects a voltage level of the battery and delivers a signal to the battery level indicator, and wherein the battery level indicator indicates a high battery level when the voltage is above a first threshold level, a medium battery level when the voltage is below the first threshold level and above a second threshold level, and a low battery level when the voltage is below the second threshold level.

18. The device of claim 16 wherein the battery is located at a neck of the lighting device connecting the power coupling element to the second housing portion and wherein the power coupling element must be detached from the power source to remove the battery.

19. The device of claim 16 wherein the battery extends toward the first portion from the second portion into the air gap provided between the first portion and second portion.

20. A system to charge a second power source of a lighting device from a first power source in a first operating mode, the system comprising:
a power coupling element configured to establish an electrical connection to the first power source;
a first light source operatively connected to the power coupling element and configured to emit light in the first operating mode;
a battery configured to supply power to a second light source in a second operating mode;
a temperature sensor configured to monitor a temperature of the battery; and
a controller in communication with the power coupling element, the battery, and the second light source and configured to receive a signal generated by the temperature sensor, wherein the controller allows battery charging at a first charging rate when the temperature of the battery is below a first predetermined temperature and allows battery charging at a second charging rate when the temperature of the battery is above the first predetermined temperature, wherein the first charging rate is higher than the second charging rate.

21. The system of claim 20 wherein the controller allows a first light emission state when the temperature of the battery is below a first predetermined temperature and allows a second light emission state when the temperature of the battery is above the first predetermined temperature, wherein the first light emission state is higher than the second light emission state.

* * * * *